(12) United States Patent
Satake

(10) Patent No.: US 7,342,630 B2
(45) Date of Patent: Mar. 11, 2008

(54) LIQUID CRYSTAL DISPLAY DEVICE

(75) Inventor: Rumo Satake, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 151 days.

(21) Appl. No.: 10/945,362

(22) Filed: Sep. 20, 2004

(65) Prior Publication Data

US 2005/0036097 A1   Feb. 17, 2005

Related U.S. Application Data

(62) Division of application No. 10/035,556, filed on Nov. 9, 2001, now Pat. No. 6,801,267.

(30) Foreign Application Priority Data

Nov. 10, 2000 (JP) ............................ 2000-344476

(51) Int. Cl.
G02B 1/1333 (2006.01)
G02B 1/1337 (2006.01)
(52) U.S. Cl. ...................... 349/138; 349/122; 349/129
(58) Field of Classification Search ................ 349/122, 349/129, 138
See application file for complete search history.

(56) References Cited

U.S. PATENT DOCUMENTS

| 5,099,344 | A | 3/1992 | Tsuboyama et al. | |
|---|---|---|---|---|
| 5,165,076 | A | 11/1992 | Tsuboyama et al. | |
| 5,673,127 | A | 9/1997 | Takahara et al. | |
| 5,872,611 | A * | 2/1999 | Hirata et al. | 349/147 |
| 5,875,008 | A | 2/1999 | Takahara et al. | |
| 5,978,056 | A | 11/1999 | Shintani et al. | 349/137 |
| 6,049,364 | A | 4/2000 | Takahara et al. | |
| 6,163,055 | A | 12/2000 | Hirakata et al. | |
| 6,218,679 | B1 | 4/2001 | Takahara et al. | |
| 6,380,561 | B1 | 4/2002 | Ohtani et al. | 257/72 |
| 6,384,892 | B1 * | 5/2002 | Johnson et al. | 349/177 |
| 6,404,474 | B1 * | 6/2002 | Watanabe et al. | 349/141 |
| 6,441,877 | B1 | 8/2002 | Watanabe | 349/138 |
| 6,507,381 | B1 | 1/2003 | Katsuya et al. | |
| 6,545,653 | B1 | 4/2003 | Takahara et al. | |
| 6,617,645 | B2 | 9/2003 | Hirakata et al. | |
| 6,812,082 | B2 | 11/2004 | Hirakata et al. | |

FOREIGN PATENT DOCUMENTS

EP     1 079 260     2/2001

(Continued)

OTHER PUBLICATIONS

U.S. Appl. No. 09/949,415 (pending) to Hirakata et al filed Sep. 7, 2001, including specification, claims, abstract and PTO filing receipt.

*Primary Examiner*—Michael H. Caley
(74) *Attorney, Agent, or Firm*—Cook, Alex, McFarron, Manzo, Cummings & Mehler, Ltd.

(57) ABSTRACT

The leakage of light and the disclination occur at the ends of the pixel electrodes where the equipotential lines bend toward the pixel electrodes. A dielectric 207 having a high dielectric constant is provided at the ends of the pixel electrodes to lift up the equipotential lines toward the opposing electrode, in order to decrease the leakage of light and the disclination.

28 Claims, 20 Drawing Sheets

FOREIGN PATENT DOCUMENTS

| | | |
|---|---|---|
| JP | 63-198020 | 8/1988 |
| JP | 63-214718 | 9/1988 |
| JP | 01-156722 | 6/1989 |
| JP | 05-323372 | 12/1993 |
| JP | 06-102527 | 4/1994 |
| JP | 6-347824 | 12/1994 |
| JP | 7-152023 | 6/1995 |
| JP | 11-44885 | 2/1999 |
| JP | 2000-194015 | 7/2000 |
| JP | 2001-133749 | 5/2001 |
| JP | 2001-133750 | 5/2001 |

* cited by examiner

LIQUID CRYSTAL DISPLAY DEVICE

This application is a divisional of U.S. application Ser. No. 10/035,556 filed on Nov. 9, 2001, now U.S. Pat. No. 6,801,267.

BACKGROUND OF THE INVENTION

1. Field of the Invention

The present invention relates to a semiconductor device having a circuit constituted by electric field effect transistors (FETs) such as thin-film transistors (TFTs) and to a method of fabricating the same. TFT stands for a semiconductor element including a semiconductor layer, a gate electrode, a source electrode and a drain electrode.

In this specification, an element substrate stands for a substrate, in general. In which semiconductor elements are formed.

In this specification, a display device stands for a device, in general, which produces a bright/dark display relying upon changes in the electric signals, and a device which produces a display by applying electric signals to the liquid crystals is called a liquid crystal display device.

2. Description of the Related Art

In recent years, attention has been given to a technology for constituting TFTs by using a thin semiconductor film (several nm to several hundred nm thick) formed on a substrate having an insulating surface. The TFT is widely applied to electronic devices such as ICs and semiconductor devices, and it has been desired to develop the TFT as a switching element particularly for the liquid crystal display devices.

Known liquid crystal display devices can be roughly divided into two types: i.e., those of the active matrix type and those of the passive matrix type. A liquid crystal display device of the active matrix type uses TFTs as switching elements and is capable of displaying a high quality. The liquid crystal display device of the active matrix is usually used for the notebook-type personal computers, but it is expected that it can also be used for household TVs and portable terminals.

Among the liquid crystal display devices of the active matrix type, the liquid crystal display device of the projection type is capable of producing a display of a large size by expanding the picture on a screen. Concerning the liquid crystal display device of the projection type, technology has recently been developed to realize the portable devices by decreasing the size of the optical system by designing the liquid crystal display panel in a small size. A decrease in the size of the optical system helps lower the cost of the optical system and, hence, makes it possible to cheaply provide a liquid crystal display device.

The liquid crystal display device of the active matrix type is generally reverse-drives the lines. Among the reverse-drives of the lines, the reverse-drive of the source lines is the one in which as shown in a schematic diagram of FIG. 21, the polarity of a signal voltage written into the pixel TFTs connected to the signal lines of m columns is differed for each of the neighboring signal lines. The polarities of the signal voltages written into the pixel TFTs connected to the signal lines are changed depending upon the frames of odd numbers (FIG. 21A) and the frames of even numbers (FIG. 21B). Upon alternatingly driving the liquid crystals by changing the polarities of the signal voltages written into the pixel TFTs, the liquid crystals are prevented from being printed. The reverse-drive of gate lines is executed by replacing the signal lines of FIG. 21 by the scanning lines.

On the interface of the oriented film, the liquid crystals are so oriented as to lift up an end thereof. In this specification, a direction from an end close to the interface of the oriented film of liquid crystal molecules toward an end lifted up from the oriented film, which is orthogonally projected onto the surface of the substrate, is referred to as "pretilted direction". Further, an angle subtended by the interface of the oriented film and by the long axis of liquid crystals near the interface of the oriented film, is referred to as "pretilted angle". The pretilted angle is imparted by either the rubbing or the switching of liquid crystals near the interface of the oriented film by applying an electric field to the liquid crystals.

In this specification, further, the defective orientation that stems from nearly the reversed pretilted direction of the adjacent liquid crystals on the interface of the oriented film is referred to as "disclination". Further, though the pretilted direction of the liquid crystals is the same, there exists a region where the pretilted angle locally differs due to the electric field distribution and the irregular rubbing. The defective orientation of liquid crystals that develop when the orientation is not normal turns out to be locally bright like the leakage of light when the two pieces of polarizer plates are arranged on the liquid crystal panel. The orientation of liquid crystals in which the pretilted direction is the same but in which the pretitlted angle is locally different, is referred to as "leakage of light" in this specification.

When the liquid crystal display device is driven by the active matrix system, the quality of display is spoiled by the leakage of light and disclination. That is, in the normally white mode, a light-shielding film is necessary for concealing the leakage of light and the disclination, and the numerical aperture drops.

In the liquid crystal display device in which fine pixels are formed such as the one of the projection type, the disclination and the leakage of light occur at a ratio which is no longer negligible relative to the pixels. Further, as the leakage of light and the disclination are not all concealed due to the deviation in the alignment of the light-shielding film, the leakage of light like bright line and the disclination are seen at the time of black display, and the contrast drops. That is, in the liquid crystal display device of the projection type, what is important is how to suppress the leakage of light and the disclination.

As compared to the smectic liquid crystals having a layered structure and a highly oriented order, the nematic liquid crystals tend to develop the disclination and the leakage of light due to an electric field established between a pixel electrode and another pixel electrode. In the orientation system using nematic liquid crystals, therefore, it is necessary to take a countermeasure to lower the disclination and the leakage of light.

How the leakage of light and the disclination occur will now be described with reference to FIG. 18 which is a sectional view schematically illustrating the pixel portion of the liquid crystal display device. Between the neighboring pixel electrodes in FIG. 18, it is now presumed that a first pixel electrode 101a has a potential of +5 V and a second pixel electrode 101b has a potential of −5 V. Let it now be presumed that an opposing electrode 102 has a potential of 0 V. In a region where the equipotential lines 103 are in parallel with the surface of the pixel electrode, the liquid crystals of the positive type are so oriented that the long axes of the liquid crystal molecules 108 are perpendicular to the surface of the pixel electrode. The liquid crystals of the positive type stand for the liquid crystals having a positive dielectric anisotropy. At the end of the pixel electrode, however, the equipotntial lines are bent, and the liquid crystal molecules 106 are oriented aslant with respect to the surface of the pixel electrode, i.e., are defectively oriented. It is considered that how to lower the bending of equipotential lines at the end of the pixel electrode is important from the standpoint of lowering the defective orientation.

At an end of the pixel electrode, there exists a region 104 of leakage of light where the pretilted angle locally differs. Since the equipotential lines are bent at the end of the pixel electrode, the liquid crystal molecules 106 at the end of the pixel electrode cannot be so switched that the long axes thereof become perpendicular to the surface of the pixel electrode.

Further, there exists a region where the pretilted direction of the liquid crystals becomes opposite to the pretilted direction determined by the rubbing direction 107 due to the electric field established at an end of the pixel electrode. Then, the pretilted angle and the pretilted direction locally change sharply on the interface of the oriented film, whereby the orientation of the liquid crystals is greatly distorted and the disclination occurs in the region 105.

That is, the disclination and the leakage of light are caused as the equipotential lines that are in parallel with the surface of the pixel electrode are bent at an end of the pixel electrode. In the invention described below, a structural contrivance is made so as to suppress the bending of equipotential lines as much as possible at the end of the pixel electrode.

SUMMARY OF THE INVENTION

It is an assignment of the present invention to provide an element structure which is capable of preventing the leakage of current and the disclination in the liquid crystal display device of the active matrix type.

In this specification, the height of a dielectric stands for a distance between the surface of the pixel electrode with which the dielectric comes into contact and the uppermost end of the dielectric. In this specification, further, the cell gap stands for a distance between the surface that comes in contact with the opposing electrode and the surface that comes in contact with the main surface of the pixel electrode. The main surface of the pixel electrode stands for a flat surface that occupies not less than 30% and, preferably, not less than 50% of the pixel electrode. That is, the main surface of the pixel electrode stands for a flat surface that occupies a maximum area of the pixel electrode.

FIGS. 5A to 5C illustrate a principle of this invention. FIG. 5 is a sectional view of a pixel portion in the liquid crystal display device. Referring to FIG. 5A, a first pixel electrode 901a and a second pixel electrode 901b are provided on a flat surface. An opposing electrode 902 is provided facing the pixel electrodes. At the end of the pixel electrode, equipotential lines 903 are bent toward the pixel electrode causing the occurrence of disclination and leakage of light.

Referring to FIG. 5B, a dielectric 904 of a high dielectric constant is formed on the ends of the pixel electrodes. With the dielectric 904 of the high dielectric constant and a dielectric of a low dielectric constant, i.e., liquid crystals being connected in series at the ends of the pixel electrodes, a voltage is reluctantly applied to the dielectric of the high dielectric constant. With the dielectric 904 of the high dielectric constant being provided at the ends of the first pixel electrode 901a and of the second pixel electrode 901b, the voltage is reluctantly applied to the dielectric of the high dielectric constant. Accordingly, the equipotential lines are lifted on the dielectric of the high dielectric constant toward the opposing electrode 902. That is, upon providing the dielectric of the high dielectric constant on the ends of the pixel electrodes, there is produced an effect for suppressing the equipotential lines from bending at the ends of the pixel electrodes. The components of equipotential lines in parallel with the surface of the pixel electrode increase resulting in an increase in the electric field component in a direction perpendicular to the surfaces of the pixel electrodes.

Referring to FIG. 5C, when the height of the dielectric 904 is too great, the equipotential lines 903 swell conspicuously toward the opposing electrode 902, which is detrimental to orienting the liquid crystals. Namely, there exists an optimum value concerning the height of the dielectric.

It is considered that the region where the disclination and the leakage of light occur is the region where the equipotential lines are bending relative to the surfaces of the pixel electrodes. Therefore, the dielectric of the high dielectric constant should be formed in the region where the disclination and the leakage of light occur to suppress the bending of equipotential lines.

FIG. 2 is a model of simulation illustrating, in cross section, the pixel portion of the liquid crystal display device, wherein the device is simulated by providing a dielectric 304 having a relative dielectric constant of 30 on a first pixel electrode 303a and on a second pixel electrode 303b. The dielectric has a height (h) of 0.5 μm and a width, in cross section, of 6.0 μm. The dielectric 304 is formed being overlapped on the first pixel electrode and on the second pixel electrode over an equal width (L). The width (L) over which the dielectric 304 is overlapped on the first pixel electrode and on the second pixel electrode is 2.0 μm. The potential of the first pixel electrode is +5 V, the potential of the second pixel electrode −5 V, and the potential of the opposing electrode 301 is 0 V. A cell gap (d) is 4.5 μm. The device is simulated by using physical values of ZLI4792 (manufactured by Merc Co.) at room temperature. The ZLI4792 exhibits a relative dielectric constant of 8.3 in the direction of long axis and a relative dielectric constant of 3.1 in the direction of short axis. The rubbing directions 305 and 306 meet at right angles with each other. The liquid crystals are levo-rotary twist oriented. The distance (s) is 2.0 μm between the first pixel electrode 303a and the second pixel electrode 303b. The pitch among the pixels is 18 μm. FIG. 3 shows the results of simulation. The first pixel electrode, second pixel electrode and opposing electrode are provided on a light-transmitting substrate.

Further, the structure without dielectric on the ends of the first pixel electrode and the second pixel electrode was simulated by using the simulation model of FIG. 19. The simulating conditions were the same as those of the simulation model of FIG. 2 except that no dielectric was used. The same elements as those of FIG. 2 are denoted by the same reference numerals. The simulated results are shown in FIG. 20.

According to the simulated results of FIG. 20, the orientation of liquid crystals is shown by a two-dimensional cross section. There are shown equipotential lines, liquid crystal director and transmission factor. The transmission factor indicates the leakage of light from the end of the first pixel electrode in a width of 3.4 μm. It is further learned that there is a disclination of a width of 3.6 μm from the end of the second pixel electrode. The distance between the first pixel electrode and the second pixel electrode is 2.0 μm and, hence, the sum (x) of width of the leakage of light and the disclination is 9.0 μm.

According to the simulated results of FIG. 3 by providing the dielectric at the ends of the pixel electrodes, however, the equipotential lines are suppressed from being bent toward the pixel electrodes due to the dielectric of the high dielectric constant and, hence, the equipotential line components increase in parallel with the surfaces of the pixel electrodes. The sum (x) of widths of the disclination and the leakage of light was 7.5 μm. The region where the disclination and the leakage of light have occurred decreased by 16% as compared to FIG. 20.

When the simulated results of FIG. 3 are compared with the simulated results of FIG. 20, it is learned that the sum (x) of widths of the disclination and the leakage of light is decreased by 1.5 μm due to the formation of the dielectric at the ends of the pixel electrodes, the dielectric having a dielectric constant larger than a dielectric constant of liquid crystals in the direction of long axis. Since the pitch among the pixels is 18 μm, the region where the disclination and the leakage of light occur is decreased by about 8% of the width of the pixel, and the numerical aperture can be improved.

The device was simulated in the simulation model of FIG. 2 by changing the height (h) of the dielectric under the following five conditions. The cell gap (d), the width (L) over which the dielectric is overlapped on the first pixel electrode and the width (L) over which the dielectric is overlapped on the second pixel electrode, vary depending upon the conditions. The dielectric possessed a relative dielectric constant of 30.

Condition (1): d=4.5 μm, L=1.0 μm
Condition (2): d=4.5 μm, L=2.0 μm
Condition (3): d=3.0 μm, L=1.0 μm
Condition (4): d=2.0 μm, L=0.2 μm FIG. 4 shows a relationship between the height of the dielectric and the sum of widths of the disclination and the leakage of light, wherein the abscissa represents a ratio of the height of the dielectric to the cell gap, and the ordinate represents the sum of the widths of the leakage of light and the disclination.

The condition (1) is compared below with the condition (2). That is, under the condition (1), the dielectric occupies a small proportion of the pixel electrode, and a small effect is exhibited for decreasing the disclination and the leakage of light. Under the condition (2), the dielectric is formed so as to be overlapped on the pixel electrodes over a width 1.3 μm to 1.4 μm close to the end thereof from a position at where the disclination and the leakage of light would occur when there is no dielectric. The disclination and the leakage of light are decreased by a width of a maximum of 1.5 μm.

In driving the liquid crystal display device by applying a voltage thereto, a region where a black level of good quality is accomplished is the one where the equipotential lines are nearly in parallel with the surface of the pixel electrode. When the dielectric is provided on such a region, the leakage of light and the disclination rather increase due to the bending of the equipotential lines that stem from the contact of the dielectric having a different dielectric constant. Under the condition (4), therefore, the dielectric is provided slightly (by 0.5 μm) on the inside of a position where the disclination and the leakage of light would occur when there is no dielectric. As compared to when there is no dielectric, therefore, the disclination and the leakage of light are decreased by a maximum of 0.5 μm.

When the conditions (2), (3) and (4) are compared with one another, it is learned that the disclination and the leakage of light are markedly decreased by providing a dielectric of a high dielectric constant for those liquid crystal display devices having larger cell gaps. It is further learned that when the height of the dielectric is too large, the equipotential lines are excessively swollen toward the opposing electrode, and the disclination and the leakage of light rather increase.

The invention (1) is concerned with a liquid crystal display device comprising pixel electrodes, a dielectric overlapped on the ends of the pixel electrodes, an oriented film covering the pixel electrodes and the dielectric, and liquid crystals on the oriented film, the liquid crystals having a positive dielectric anisotropy, and the dielectric having a relative dielectric constant larger than a relative dielectric constant of the liquid crystals in the direction of long axis.

In the invention (2), the liquid crystals have a negative dielectric anisotropy, and the dielectric has a relative dielectric constant larger than the relative dielectric constant of the liquid crystals in the direction of short axis.

In both the invention (1) and the invention (2), the voltage is applied in a divided manner to an insulator of liquid crystals having a low dielectric constant in a circuit in which the insulator of liquid crystals of the low dielectric constant and a dielectric of a high dielectric constant are connected in series and are held between the pixel electrodes and the opposing electrode. By providing the dielectric of the high dielectric constant at the ends of the pixel electrodes, therefore, the equipotential lines are lifted up toward the opposing electrode. This suppresses the occurrence of the leakage of light and the disclination caused by the bending of equipotential lines toward the pixel electrodes at the ends of the pixel electrodes. To obtain this action, the relative dielectric constant of the dielectric provided at the ends of the pixel electrodes must be larger than the relative dielectric constant of the liquid crystals.

The invention (3) is concerned with a liquid crystal display device comprising pixel electrodes, a dielectric overlapped on the ends of the pixel electrodes, an oriented film covering the dielectric and the pixel electrodes, and liquid crystals on the oriented film, the dielectric having a relative dielectric constant of not smaller than 20.

In the invention (3), it is desired that the dielectric has a relative dielectric constant which is not smaller than 20, so that the relative dielectric constant of the dielectric is larger than the relative dielectric constant of the liquid crystals as considered from a general dielectric constant of the liquid crystals.

In the case of the nematic liquid crystals having a positive dielectric anisotropy, the relative dielectric constant of the liquid crystals in the direction of long axis is usually from about 8 to about 20. In the case of the liquid crystal display device using nematic liquid crystals having the positive dielectric anisotropy, therefore, it is considered that the relative dielectric constant of the dielectric needs be not smaller than 20.

In the case of the nematic liquid crystals having a negative dielectric anisotropy, the relative dielectric constant of the liquid crystals in the direction of short axis is usually from about 8 to about 20. In the case of the liquid crystal display device using nematic liquid crystals having the negative dielectric anisotropy, therefore, it is considered that the relative dielectric constant of the dielectric needs be not smaller than 20.

The invention (4) is concerned with a liquid crystal display device comprising pixel electrodes, a dielectric overlapped on the ends of the pixel electrodes, an oriented film covering the dielectric and the pixel electrodes, and liquid crystals on the oriented film, the dielectric having a relative dielectric constant of not smaller than 30.

In the invention (4), the relative dielectric constant of the dielectric is selected to be 30 to observe the effect of greatly decreasing the disclination and the leakage of light in the simulation by using the model of FIG. 2. The higher the dielectric constant of the dielectric, the larger the effect for lifting up the, toward the opposing electrode, the equipotential lines that bend toward the pixel electrodes at the ends of the pixel electrodes. Therefore, the effect for greatly decreasing the disclination and the leakage of light is obtained even when the dielectric has a relative dielectric constant which is larger than 30.

The inventions (5) to (8) comprise pixel electrodes, an oriented film on the pixel electrodes, a dielectric on the ends of the pixel electrodes and liquid crystals on the oriented film and on the dielectric, making a difference from the inventions (1) to (4). Even by forming the oriented film which is an insulator on the pixel electrodes and by forming the dielectric thereon, the equipotential lines can be lifted by the dielectric at the ends of the pixel electrodes toward the opposing electrodes. In the liquid crystal display device using liquid crystals having a positive dielectric anisotropy, the relative dielectric constant of the dielectric must be larger than the relative dielectric constant of the liquid crystals in the direction of long axis, as a matter of course. In the liquid crystal display device using liquid crystals having a negative dielectric anisotropy, the relative dielectric constant of the dielectric must be larger than the relative dielectric constant of the liquid crystals in the direction of short axis. The relative dielectric constant of the dielectric may be selected to be not smaller than 20 considering from a general dielectric constant of the liquid crystals. As the effect is confirmed by simulation, the relative dielectric constant of the dielectric may be selected to be not smaller than 30.

The invention (9) is concerned with the liquid crystal display device of (4) or (8), wherein the cell gap is not smaller than 2.0 μm but is not larger than 4.5 μm, and the height of the dielectric is not larger than 17% of the cell gap.

The invention (9) will now be described with reference to a graph of FIG. 4. The leakage of light and the disclination decrease with an increase in the height of the dielectric, become constant at a certain height of the dielectric and, then, rather increase as the height of the dielectric further increases. In the liquid crystal display device having the cell gap which is not smaller than 2.0 μm but is not larger than 4.5 μm, the disclination and the leakage of light rather increase as the dielectric becomes too high. When the height of the dielectric is not larger than 17% of the cell gap, however, the leakage of light and the disclination decrease monotonously with an increase in the height of the dielectric.

The invention (10) is concerned with a liquid crystal display device of any one of (1) to (5), comprising an opposing electrode provided facing the pixel electrodes, and an oriented film formed on the opposing electrode, wherein a gap is maintained between the dielectric and the oriented film formed on the opposing electrode.

In this invention, the dielectric provided at the ends of the pixel electrodes is different from a spacer that is provided for maintaining the cell gap of the liquid crystal display device to be of a predetermined thickness.

The invention (11) is concerned with a liquid crystal display device of any one of (1) to (8), wherein the dielectric is an oxide containing titanium or tantalum. For example, a ditantalum pentoxide ($Ta_2O_5$) and a titanium dioxide ($TiO_2$) have relative dielectric constants of as high as 30 or larger, and can be used as the dielectric of the invention.

The thus determined structure of the pixel portion of the invention is for bringing the lines of electric force of when an electric field is applied to be perpendicular to the flat surface on where the pixel electrodes are formed, and can be widely used as means for decreasing the defective orientation of liquid crystals in both the orientation system of the normally white mode and the orientation system of the normally black mode.

If defective orientation of liquid crystals due to ruggedness is not induced, this invention can be applied to the orientation system that uses smectic liquid crystals. For example, the invention can be applied to the liquid crystal display devices using ferroelectric liquid crystals and anti-ferroelectric liquid crystals. The invention can be further applied to a liquid crystal display device using a material cured by adding liquid crystalline high molecules to the smectic liquid crystals followed by the irradiation with light (e.g., ultraviolet rays).

The constitution of the pixel portion of the invention can be widely used as means for adjusting the electric field distribution in the display device which optically modulates the dimmer layer by applying a voltage to the dimmer layer through the semiconductor elements.

In the liquid crystal display device of the projection type, in particular, the leakage of light and the disclination are projected onto the screen being enlarged through an optical system that uses lenses. Therefore, this invention is particularly effective in the liquid crystal display device of the projection type.

The effect of the invention can be exhibited to a sufficient degree even when there is formed an inorganic film having a function for preventing the short-circuiting as an insulating film between the upper surfaces of the pixel electrodes and the oriented film. Presence of the dielectric on the ends of the pixel electrodes still makes it possible to prevent the equipotential lines from bending toward the pixel electrodes.

DESCRIPTION OF THE PREFERRED EMBODIMENTS

EXAMPLES

In order to maintain a high numerical aperture in the pixel portions of the liquid crystal display device, it is a recommended method to form an interlayer film on the scanning lines, on the signal lines and on the capacitor electrodes, and to form the ends of the pixel electrodes being overlapped on the scanning lines, on the signal lines and on the capacitor electrodes. In the top view illustrating the embodiment of the invention, however, the scanning lines, signal lines and pixel electrodes are drawn without being overlapped one upon the other for easy comprehension of the positional relationship among the characteristic portions of the pixel electrodes, scanning lines and signal lines. A recommended method of fabricating the liquid crystal display device will be described later in detail by way of a working example.

Figure 1:
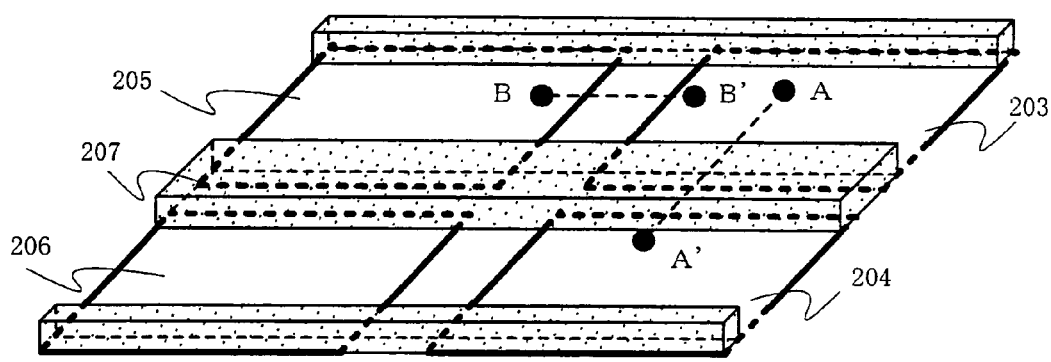
FIG. 1 is a perspective view (embodiment) illustrating a pixel portion of this invention.
Figure 2:
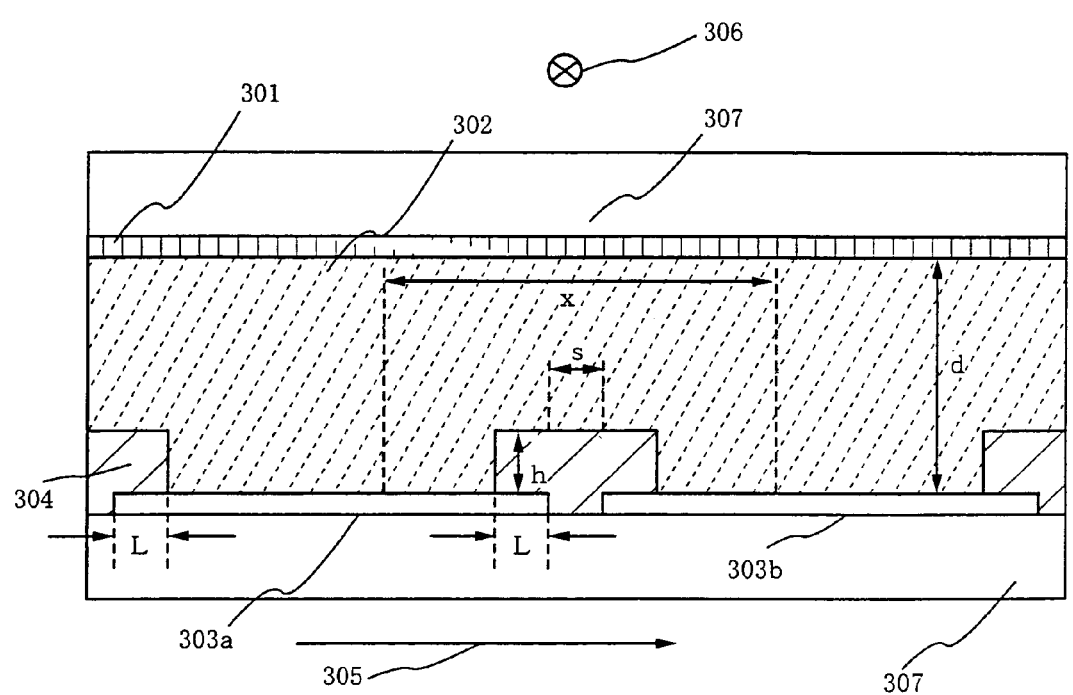
FIG. 2 is a sectional view illustrating a model of simulation.
Figure 3:
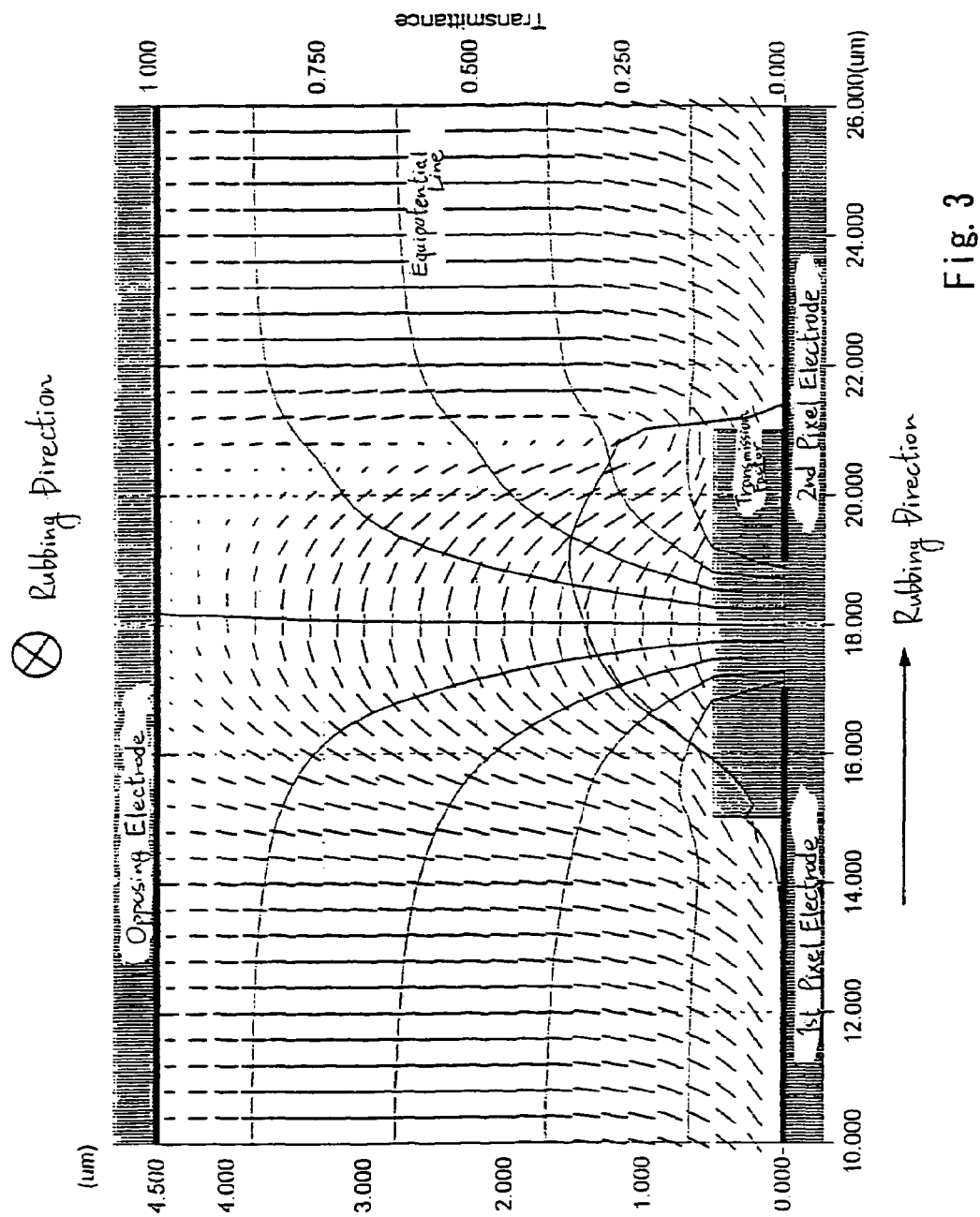
FIG. 3 is a sectional view illustrating the results of simulation of when a dielectric is provided on the ends of pixel electrodes.

FIG. 1 is a perspective view illustrating an embodiment of this invention. A dielectric 207 is provided on the ends of a first pixel electrode 203 and a second pixel electrode 204. The dielectric 207 is provided on the ends of a third pixel electrode 205 and a fourth pixel electrode 206, as a matter of course.

Figure 6:
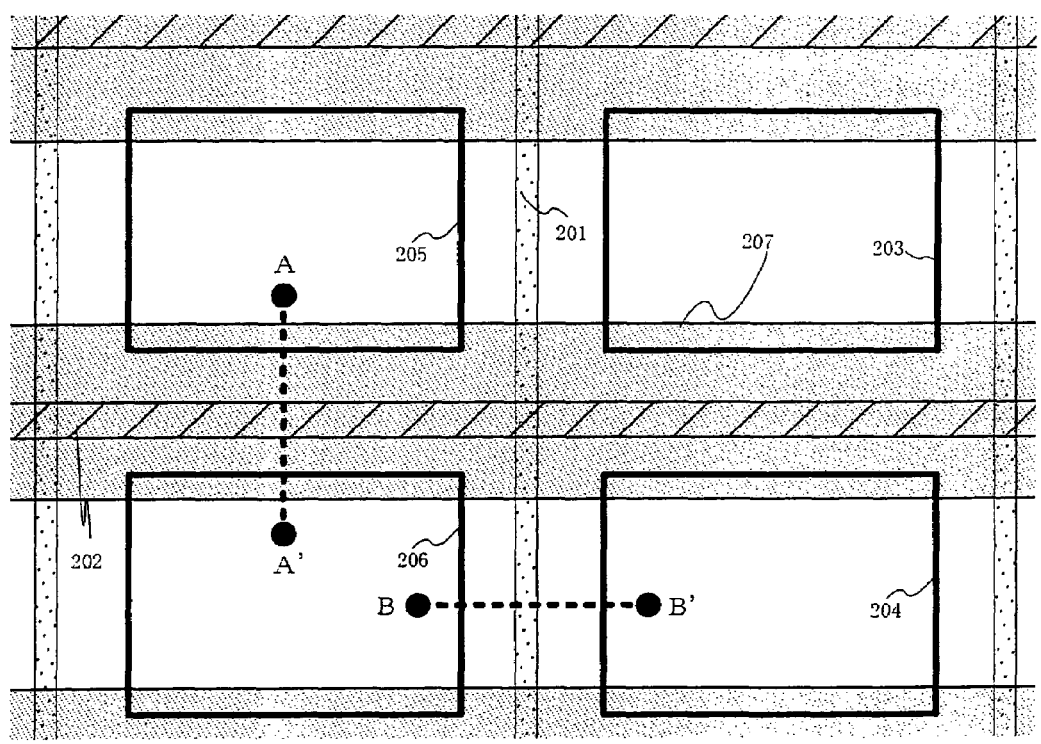
FIG. 6 is a top view (embodiment) illustrating the ends of the pixel electrodes of this invention.

FIG. 6 is a top view of the perspective view of FIG. 1. A chain line A-A' and a chain line B-B' in the perspective view of FIG. 1 correspond to the positions of a chain line A-A' and a chain line B-B' in FIG. 6. The pixel portions in the top view of FIG. 6 represents a liquid crystal display device which reverse-drives the gate lines. A dielectric film 207 is formed on the ends of the first pixel electrode 203 and the second pixel electrode 204 along the scanning line 202. It is desired that the dielectric film has a relative dielectric constant of not smaller than 20 or not smaller than 30. A signal line 201 is provided intersecting the scanning line. The third pixel electrode 205 is neighboring the first pixel electrode with the signal line sandwiched therebetween. The fourth pixel electrode 206 is neighboring the second pixel electrode with the signal line sandwiched therebetween.

In the liquid crystal display device which reverse-drives the gate lines, the pixel electrodes having potentials of polarities different from each other are neighboring each other at the ends of the pixel electrodes along the scanning lines. Therefore, an equipotential plane is subject to be bent toward the pixel electrodes. It is therefore desired to provide the dielectric 207 on the ends of the pixel electrodes along the scanning line to impart the action for lifting up the equipotential plane at the ends of the pixel electrodes toward the opposing electrode.

The dielectric may or may not be provided on the ends of the first pixel electrode 203 and the third pixel electrode 205 which are neighboring with the signal line 201 sandwiched therebetween. The first pixel electrode 203 and the third pixel electrode 205 are neighboring maintaining potentials of the same polarity, and the equipotential lines are not so much bent at the ends of the first pixel electrode and the third pixel electrode. Therefore, whether the dielectric be provided at the end of the first pixel electrode 203 and at the end of the third pixel electrode 205 maintaining potentials of the same polarity, may be determined depending upon the degree of leakage of light that occurs when there is no dielectric.

Figure 7A:
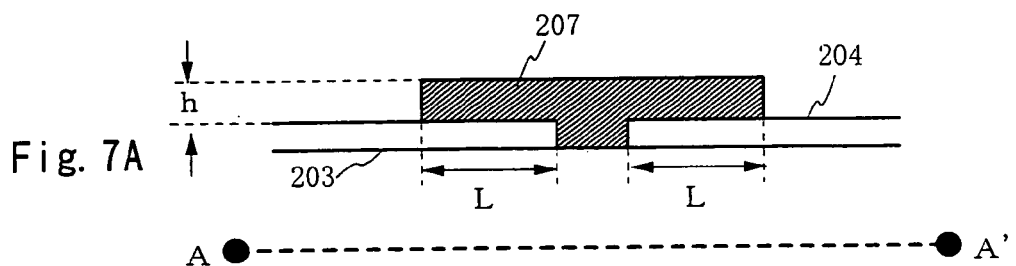
FIGS. 7A and 7B are sectional views (embodiments) illustrating the ends of the pixel electrodes of this invention.
Figure 7B:
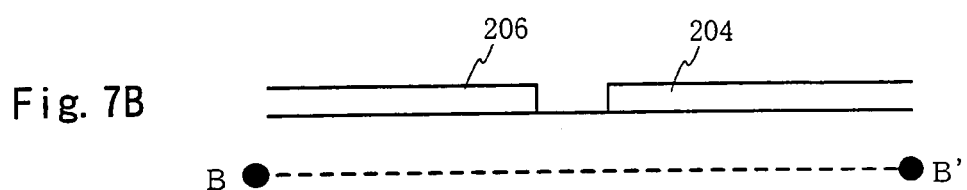

FIGS. 7A and 7B are sectional views of when the top view of FIG. 6 is cut along the chain line A-A' and the chain line B-B'. FIG. 7A illustrates a state where the first pixel electrode 203 is neighboring the second pixel electrode 204 with the scanning line (not shown) sandwiched therebetween, and the dielectric 207 is formed on the ends of the first pixel electrode and the second pixel electrodes. FIG. 7B illustrates a state where the dielectric is not provided on the second pixel electrode 204 and the fourth pixel electrode 206 which are neighboring each other with the signal line (not shown) sandwiched therebetween.

In the liquid crystal display device which reverse-drives the source lines, the signal line 201 may be replaced by the scanning line, and the scanning line 202 may be replaced by the signal line in the top view of FIG. 6.

As the dielectric, there may be used titanium dioxide ($TiO_2$).

Figure 8A:
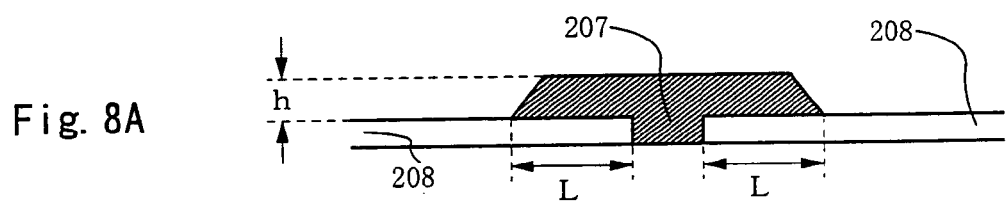
FIGS. 8A to 8C are sectional views (embodiments) illustrating the ends of the pixel electrodes of this invention.
Figure 8B:
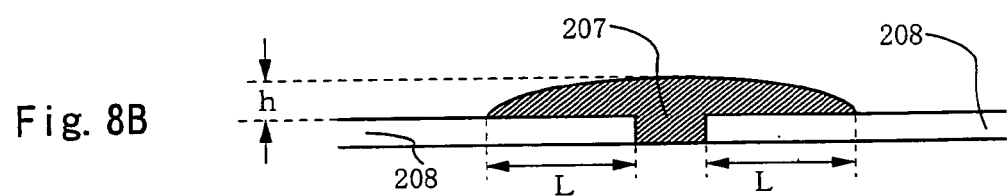
Figure 8C:
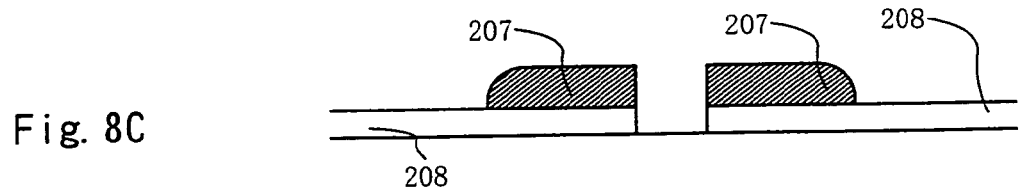

The cross section of the dielectric of the invention needs not be of a rectangular shape as shown in the sectional view of FIG. 7. As shown in a sectional view of FIG. 8A, for example, the dielectric 207 formed on the ends of the pixel electrodes 208 may have a trapezoidal shape in cross section. As shown in a sectional view of FIG. 8B, further, the dielectric 207 provided on the ends of the pixel electrodes 208 may have a mild arcuate shape in cross section. When the dielectric has a rectangular shape in cross section, the tips of the hairs tend to be disturbed at the time of rubbing, and the rubbing becomes irregular near the bottom of the dielectric that is in contact with the pixel electrodes. The dielectric having a trapezoidal shape or an arcuate shape in cross section is effective in conducting the rubbing. When the dielectric is formed in the rectangular shape, the electric field becomes discrete near the apex of rectangle of the dielectric, causing a defect in the arrangement of liquid crystals. It is therefore desired to form the dielectric in a trapezoidal shape or in an arcuate shape in cross section to suppress the loss of uniformity in the distribution of electric field. Either the dielectric has the trapezoidal shape or the arcuate shape in cross section, the height (h) of the dielectric stands for a distance between the surface of the pixel electrode in which the dielectric comes in contact and the uppermost end of the dielectric. The width (L) of the dielectric stands for a distance from the end of the pixel electrode to a tangent between the side surface of the dielectric and the upper surface of the pixel electrode. That is, the width (L) stands for a width over which the dielectric is overlapped on the pixel electrode. The disclination and the leakage of light are caused by the bending of the equipotential lines at the ends of the pixel electrodes. Therefore, the dielectric 207 that works to suppress the bending of equipotential lines should exist on at least the ends of the pixel electrodes 208 as shown in FIG. 8C.

Figure 9A:
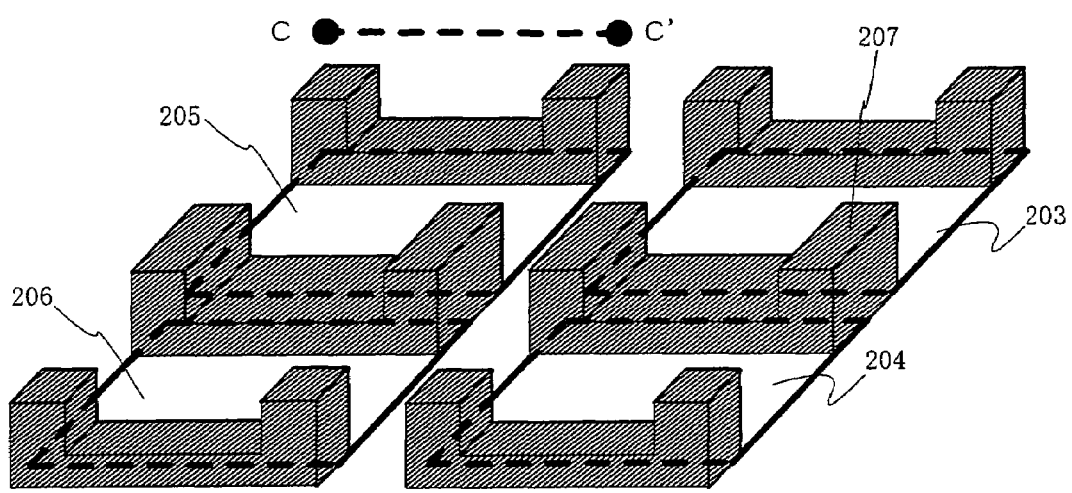
FIGS. 9A and 9B are views (embodiments) illustrating a pixel portion of this invention.

In the liquid crystal display device which reverse-drives the lines in a perspective view of FIG. 9A, the first pixel electrode 203 and the third pixel electrode 205 have potentials of the same polarity, and the second pixel electrode 204 and the fourth pixel electrode 206 have potentials of a polarity different from that of the first pixel electrode 203. The vicinity of apex of the first pixel electrode 203 is close to the second pixel electrode 204 and the third pixel electrode 206 having potentials of a polarity different from that of the first pixel electrode. At the apex of the first pixel electrode, therefore, the equipotential plane greatly bends toward the pixel electrode. It is therefore desired that only a portion of the dielectric 207 near the apex of the pixel electrode is locally swollen toward the opposing substrate, the dielectric 207 being so formed as to be overlapped on both the end of the second pixel electrode 204 and the end of the first pixel electrode 203 neighboring thereto maintaining a potential of a different polarity. This makes it possible to lower the leakage of highly bright light that is seen near the apex of a rectangle of the pixel electrodes that are patterned in a rectangular shape.

Figure 9B:
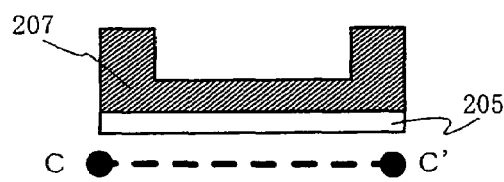

FIG. 9B is a sectional view of when the perspective view of FIG. 9A is cut along the chain line C-C'. The height of the dielectric 207 is locally increased at near the apexes of the fourth pixel electrode 205 that is patterned in a rectangular shape.

Figure 10A:
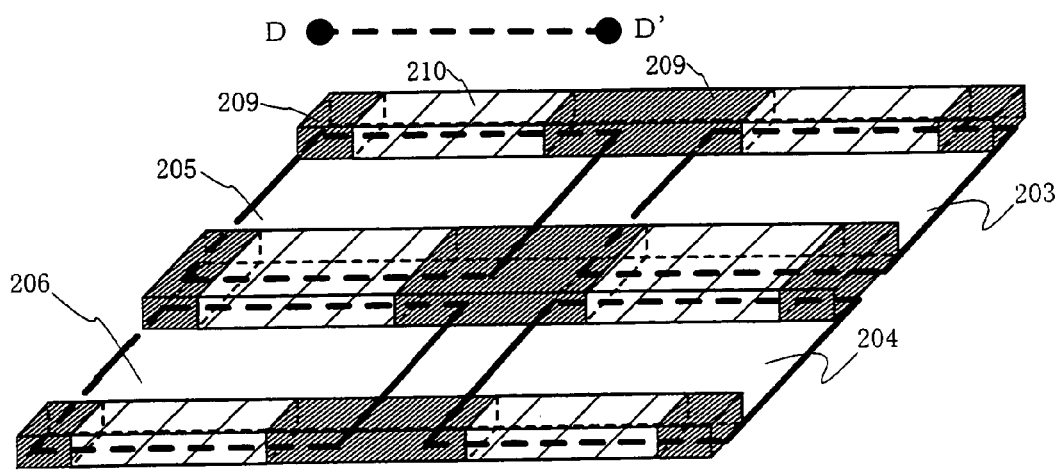
FIGS. 10A and 10B are views (embodiments) illustrating the pixel portion of this invention.

In the liquid crystal display device which reverse-drives the lines in a perspective view of FIG. 10A, the first pixel electrode 203 and the third pixel electrode 205 have potentials of the same polarity, and the second pixel electrode 204 and the fourth pixel electrode 206 have potentials of a polarity different from that of the first pixel electrode 203. In this case, the dielectrics 209 to 210 are so formed as to be overlapped on the ends of both the second pixel electrode and the first pixel electrode neighboring thereto maintaining a potential of a different polarity. Here, the dielectrics 209 provided near the apex of the pixel electrode have a relative dielectric constant larger than that of the dielectric 210 lying therebetween. The dielectric having a higher relative dielectric constant is more effective in lifting up the equipotential lines at the ends of the pixel electrodes toward the opposing electrode. By suitably selecting the relative dielectric constant of the dielectric 209, therefore, it is allowed to prevent the leakage of highly bright light near the apex of the pixel electrode.

As for a method of changing the relative dielectric constant of the dielectric, it is allowable to use two kinds of films having dissimilar relative dielectric constants as materials of the dielectric, or to change the relative dielectric constant by changing the film-forming conditions while using the same material. In depositing the titanium dioxide, the refractive index of the titanium dioxide film that is formed can be increased by lowering the oxygen pressure at the time of deposition (Optical Thin-Film, Kyoritsu Shuppan Co., p. 143). There is a relationship $n^2/c^2 = \epsilon_0 \epsilon_r \mu$ among the refractive index $n_1$, dielectric constant $\epsilon_0$ of vacuum, relative dielectric constant $\epsilon_r$ and magnetic permeability $\mu$. Here, since the magnetic permeability $\mu$ remains nearly constant irrespective of the substances, the relative dielectric constant $\epsilon_r$ of the film tends to increase with an increase in the refractive index (n) of the film that is deposited. By changing the oxygen pressure at the time of deposition, therefore, the refractive index changes, and a dielectric film having a different relative dielectric constant is formed.

Figure 10B:
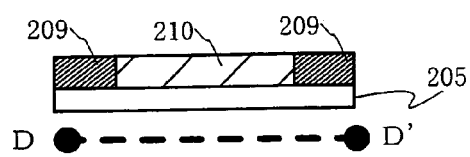

FIG. 10B is a sectional view of when the perspective view of FIG. 10A is cut along a chain line D-D'. In providing the dielectric on the end of the third pixel electrode 205, the relative dielectric constant of the dielectrics 209 formed near the apexes of the pixel electrodes is selected to be higher than the relative dielectric constant of the dielectric 210 between the dielectrics 209.

Embodiment 1

An Embodiment 1 of the present invention will now be described with reference to FIGS. 11A to 13B.

Figure 12A:
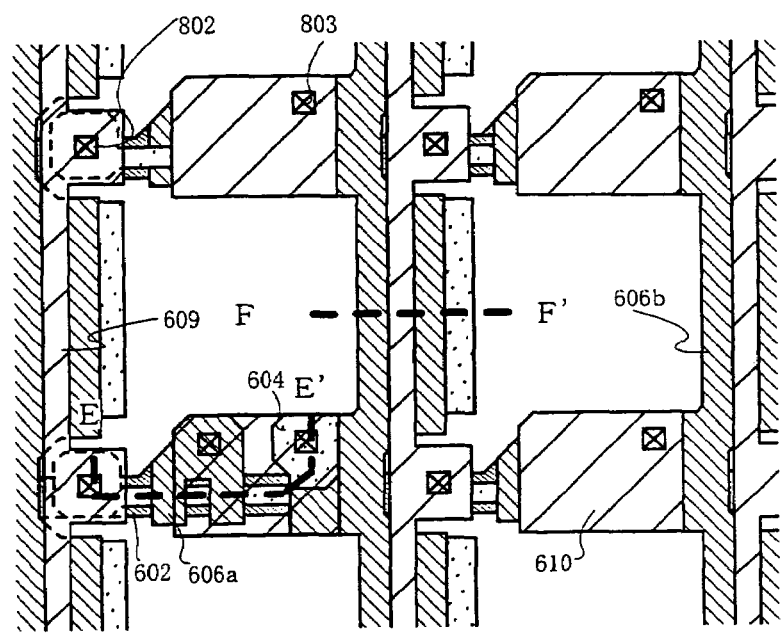
FIGS. 12A and 12B are a top view and a sectional view (embodiment 2) illustrating a step for fabricating the active matrix substrate.
Figure 12B:
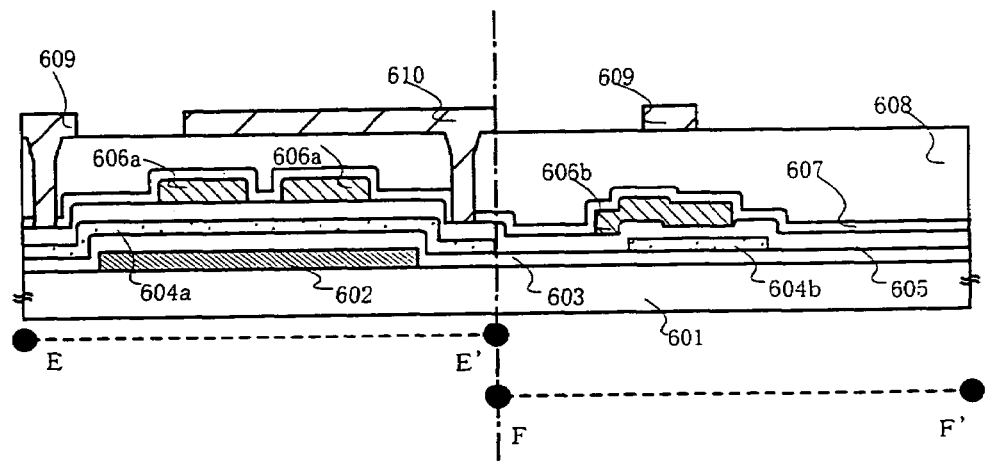

First, an electrically conducting film is formed on a substrate 601 having an insulating surface shown in a sectional view of FIG. 12B, and is patterned to form a scanning line 602. The scanning line also works as a light-shielding film for protecting a semiconductor layer that will be formed later from light. Here, a quartz substrate is used as a substrate 601, and a laminated-layer structure of a polysilicon film (50 nm thick) and a tungsten silicide (W–Si) film (100 nm thick) is used as the scanning line 602. Further, the polysilicon film prevents the substrate from being contaminated with the tungsten silicide.

Next, an insulating film 603 is formed maintaining a thickness of 100 to 1000 nm (typically, 300 to 500 nm) to cover the scanning line 602. Here, a silicon oxide film having a thickness of 100 nm formed by the CVD method and a silicon oxide film having a thickness of 280 nm formed by the LPCVD method are laminated one upon the other.

Then, an amorphous semiconductor film is formed maintaining a thickness of 10 to 100 nm. Here, the noncrystalline silicon film (amorphous silicon film) is formed maintaining a thickness of 69 nm by the LPCVD method. Next, the noncrystalline silicon film (amorphous silicon film) is crystallized by a technology disclosed in Japanese Patent Laid-Open No. 78329/1996. According to the technology disclosed in this publication, a metal element is selectively added to the noncrystalline silicon film to promote the crystallization followed by the heat treatment to form a crystalline silicon film which spreads starting from the region where the metal element is added. Here, nickel is used as a metal element for promoting the crystallization and, then, a heat treatment (450° C., one hour) is executed for dehydrogenation, followed by another heat treatment (600° C., 12 hours) for crystallization.

Then, nickel is put to the gettering from the region where the active layer of TFT is formed. The region of the active layer of TFT is covered with a mask (silicon oxide film), phosphorus (P) is added to a portion of the crystalline silicon film and is heat-treated (at 600° C. in a nitrogen atmosphere for 12 hours).

Figure 11A:
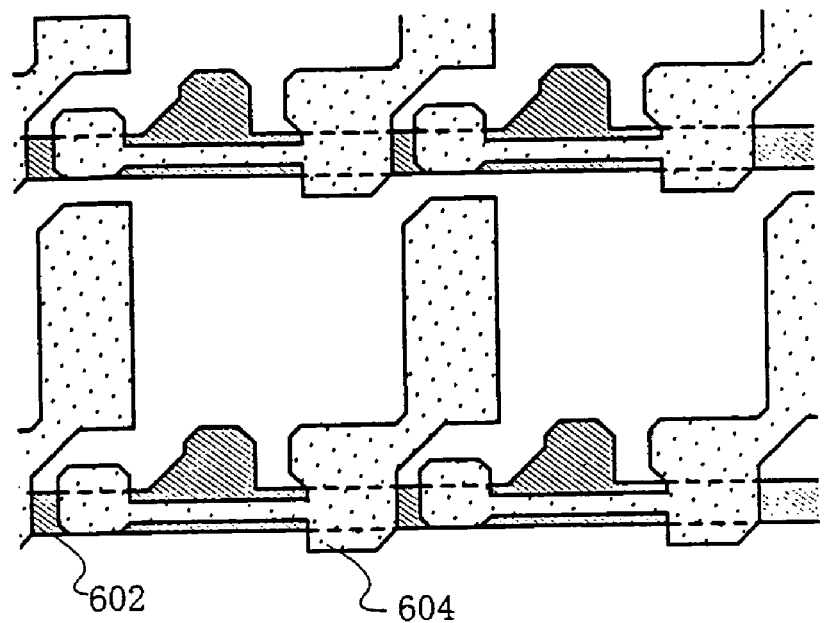
FIGS. 11A and 11B are top views (embodiment 1) illustrating the steps for fabricating an active matrix substrate.

Then, after the mask is removed, unnecessary portions of the crystalline silicon film are removed by patterning to form semiconductor layers 604a and 604b. The semiconductor layers 604a and 604b are the same semiconductor layers 604. FIG. 11A is a top view of the pixel after the semiconductor layer is formed. There are shown a scanning line 602 and a semiconductor layer 604.

Next, to form a holding capacity, a resist is formed, and a portion (region for forming the holding capacity) 604b of the semiconductor layer is doped with phosphorus.

Then, the resist is removed and an insulating film is formed to cover the semiconductor layer. Then, to increase the capacity of the holding capacitor, a resist is formed, and the insulating film is removed from the region 604b where the holding capacity is to be formed.

Then, an insulating film (gate-insulating film 605) is formed by the thermal oxidation. Due to this thermal oxidation, the gate-insulating film finally acquires a thickness of 80 nm. On the region where the holding capacity is to be formed, there is formed an insulating film having a thickness smaller than that of other regions. It is desired that the insulating film has a thickness of 40 to 50 nm on the region where the holding capacity is to be formed.

Next, the channel doping is effected onto the whole surface or selectively to add p-type or n-type impurities at a low concentration to the region that serves as the channel region of the TFT. The step of this channel doping is the one for controlling the threshold voltage of the TFT. Here, boron is added by the ion-doping method by exciting diborane ($B_2H_6$) by plasma but without effecting the mass separation. It is, of course, allowable to employ the ion plantation method by effecting the mass separation.

Next, contact holes that reach the scanning lines are formed by etching the insulating film.

Then, an electrically conducting film is formed and is patterned to form a gate electrode 606a and a capacitor wiring 606b. Here, use is made of a laminated-layer structure of a silicon film (150 nm thick) doped with phosphorus and a tungsten silicide film (150 nm thick). The holding capacitor is formed by parts of the capacitor wiring and of the semiconductor layer with the insulating film 605 as a dielectric.

Figure 11B:
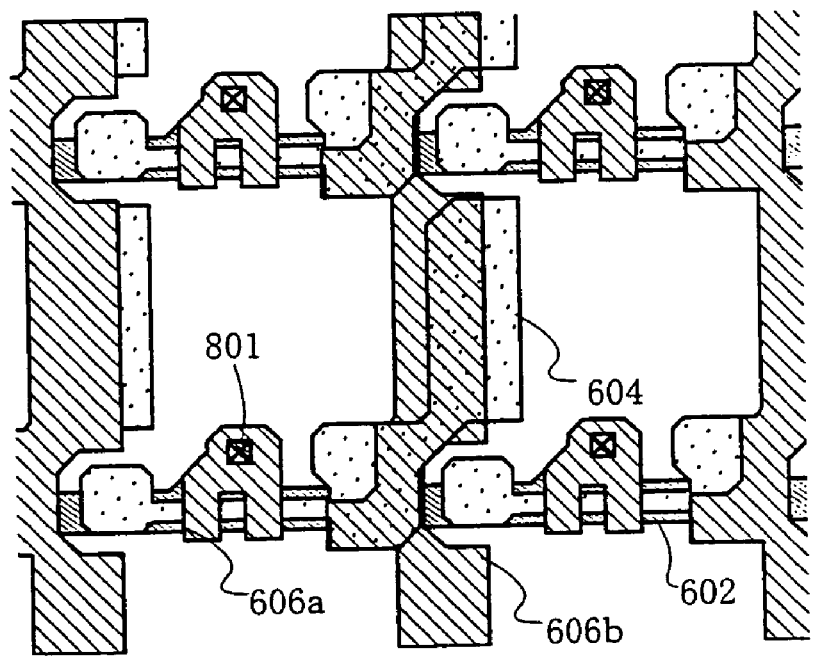

FIG. 11B is a top view of a pixel after the gate electrode and the capacitor wiring are formed. The gate electrode 606a is electrically conductive to the scanning line 602 through a contact hole 801. A region where the semiconductor layer 604 is overlapped on the capacitor wiring 606b via an insulating film works as the holding capacitor.

Then, by using the gate electrode and the capacitor wiring as masks, phosphorus is added at a low concentration in a self-aligned manner. The concentration of phosphorus in the region to where it is added at a low concentration, is adjusted to be from $1\times10^{16}$ to $5\times10^{18}$ atoms/cm$^3$ and, typically, from $1\times10^{16}$ to $5\times10^{18}$ atoms/cm$^3$.

Next, a resist is formed and phosphorus is added at a high concentration by using the resist as a mask, thereby to form a region containing impurities at a high concentration that serves as a source region or a drain region. The phosphorus concentration in the region of the high impurity concentration is adjusted to be from $1\times10^{20}$ to $1\times10^{21}$ atoms/cm and, typically, from $2\times10^{20}$ to $5\times10^{20}$ atoms/cm$^3$. In the semiconductor layer, a region overlapped on the gate electrode serves as a channel region, and a region covered with a resist serves as an impurity region of a low concentration and works as an LDD region. After the impurities are added, the resist is removed.

Though not diagramed, the region that becomes an n-channel TFT is covered with a resist, and boron is added to form a source region or a drain region in order to form a p-channel TFT used for a drive circuit formed on the same substrate as the pixels.

Next, after the resist is removed, a passivation film 607 is formed to cover the gate electrode 606a and the capacitor wiring 606b. Here, a silicon oxide film is formed maintaining a thickness of 70 nm. Next, the heat treatment is effected to activate the n-type or p-type impurities added into the semiconductor layer at their respective concentration. Here, the heat treatment is effected at 950° C. for 30 minutes.

Then, an interlayer insulating film 608 of an inorganic material is formed. In this Embodiment, a silicon oxynitride film is formed maintaining a thickness of 800 nm.

Then, a contact hole is formed to reach the semiconductor layer, and an electrode 610 and a signal line 609 are formed. In this Embodiment, the electrode and the signal lines are formed of a laminated-layer film of a four-layer structure in which a Ti film is formed maintaining a thickness of 60 nm, a TiN film is formed maintaining a thickness of 40 nm, an aluminum film containing Si is formed maintaining a thickness of 300 nm, and a TiN film is formed maintaining a thickness of 100 nm all by sputtering in a continuous manner.

FIG. 12A is a top view of the pixel after the electrode and the signal lines are formed. The signal line 609 is electrically conductive to the semiconductor layer 604 through the contact hole 802. The electrode 610 is electrically conductive to the semiconductor layer 604 through the contact hole 803. FIG. 12B is a sectional view of the pixel portion formed through the above steps.

Then, the hydrogenation treatment is effected at 350° C. for one hour.

Figure 13A:
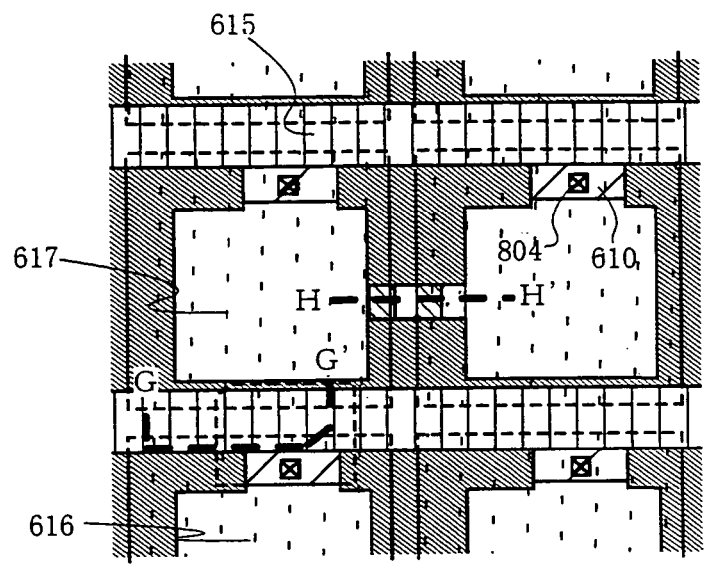
FIGS. 13A and 13B are a top view and a sectional view (embodiment 1) illustrating a step for fabricating the active matrix substrate.
Figure 13B:
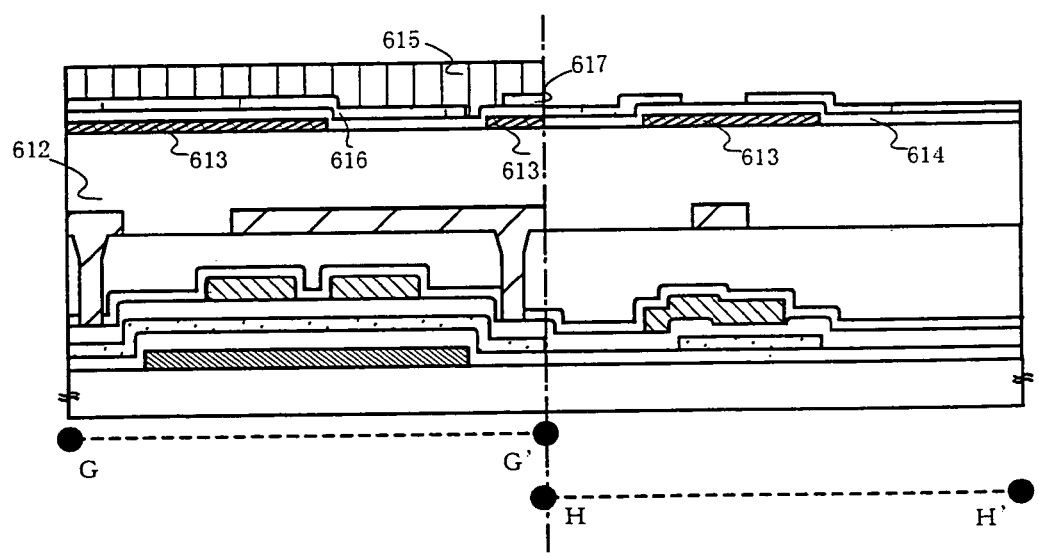

Next, an interlayer-insulating film 612 of an organic resin material is formed as shown in a sectional view of FIG. 13B. Here, an acrylic resin film having a thickness of 1.0 μm is used. Thereafter, a light-shielding electrically conducting film is formed maintaining a thickness of 100 nm on the interlayer-insulating film to thereby form a light-shielding layer 613.

Next, an insulating film 614 is formed maintaining a thickness of 100 nm. The insulating film forms a silicon oxynitride film of a thickness of 100 nm to 300 nm.

Then, a contact hole (not shown) is formed to reach the electrode 610. Next, after a transparent electrically conducting film (an indium-tin oxide (ITO) film here) is formed maintaining a thickness of 100 nm, pixel electrodes are formed by patterning. The distance is 2.0 μm between the first pixel electrode 616 and the second pixel electrode 617.

There can be formed a holding capacitor using the pixel electrode (e.g., first pixel electrode 616) and the light-shielding film 613 as electrodes, and the insulating film 614 as a dielectric.

Then, the TiO$_2$ film is formed by the electron beam vaporization method. The material to be vaporized is contained in a crucible. Thermoelectrons emitted from the filament in high degree of vacuum are accelerated by a predetermined voltage and impinge upon the material to be vaporized, and the material to be vaporized is heated and vaporizes due to the kinetic energy. The vaporized particles condense on the substrate. Oxygen is introduced as a reactive gas to trigger the oxidizing reaction. The TiO$_2$ film is formed maintaining a thickness of 0.5 μm.

Then, a resist is formed, and the TiO$_2$ film is etched with an aqueous solution of hydrogen fluoride (HF). The TiO$_2$ film is formed in a striped shape so as to be overlapped on the end of the first pixel electrode 616 and on the end of the second pixel electrode 617 over a width of 2.0 μm. The TiO$_2$ film has a width of 6.0 μm. A dielectric film 615 is formed on the ends of the pixel electrodes by etching the TiO$_2$ film which is a dielectric having a high dielectric constant.

FIG. 13A is a top view of the pixel portion after the dielectric film 615 is formed. The electrode 610 is electrically conductive to the pixel electrode (e.g., third pixel electrode 618) through the contact hole 804. FIG. 13B is a sectional view of when the top view of FIG. 13A is cut along a chain line H-H' and a chain line G-G'.

In this specification, the substrate fabricated through the above steps is called active matrix substrate.

The active matrix substrate of this Embodiment can be used for the liquid crystal display device of the transmission type. When there is used, as a pixel electrode, an electrically conducting film having a function of reflecting light instead of the transparent electrically conducting film, the active matrix substrate of this Embodiment can be used for the liquid crystal display device of the reflection type.

Embodiment 2

This Embodiment deals with the steps for fabricating a liquid crystal display device of the active matrix type using the active matrix substrate fabricated in Embodiment 1. The description refers to FIG. 14 in which the same elements (first pixel electrode 616, second pixel electrode 617) as those of FIGS. 13A and 13B are denoted by the same reference numerals as those of FIGS. 13A and 13B.

First, the active matrix substrate is obtained in accordance with Embodiment 1.

Next, a transparent electrode 701 of a transparent electrically conducting film is formed on a light-transmitting substrate 700. In this Embodiment, the thus constituted substrate is called opposing substrate.

Then, an oriented film 702 is formed on the active matrix substrate and on the opposing substrate, and is rubbed. The liquid crystal display device fabricated according to this Embodiment is a panel of the projection type having a diagonal size of from about 0.3 inches to about 1 inch. In the panel of this kind, the pixels have a size of as small as 10 μm to 20 μm, and the defect caused by spacers becomes no longer negligible. The liquid crystal display device of this Embodiment, therefore, uses no spacer.

The active matrix substrate on which the pixel portions and the drive circuits are formed, is stuck to the opposing substrate with a sealing member (not shown). The sealing member contains a filler, and the two pieces of substrates are stuck together maintaining a uniform gap due to the filler. The cell gap between the pixel portions is 4.5 μm.

Figure 14:
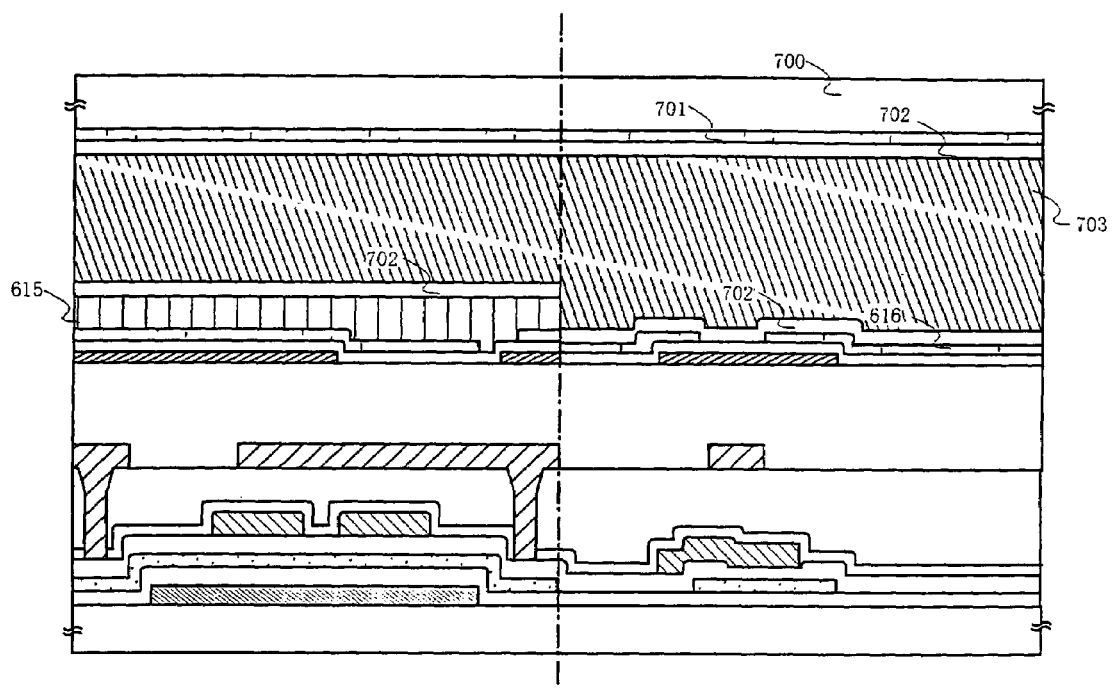
FIG. 14 is a sectional view (embodiment 2) illustrating a liquid crystal display device.

Thereafter, a liquid crystal material 703 is poured into between the two substrates, and is completely sealed with a sealing agent (not shown). The liquid crystal material 703 may be a known material. Thus, the liquid crystal display device of the active matrix type is completed as shown in FIG. 14. As required, further, the active matrix substrate or the opposing substrate is divided into a desired shape. Further, a polarizer plate is suitably provided relying upon the known technology. An FPC is stuck, too, according to the known technology.

Figure 4:
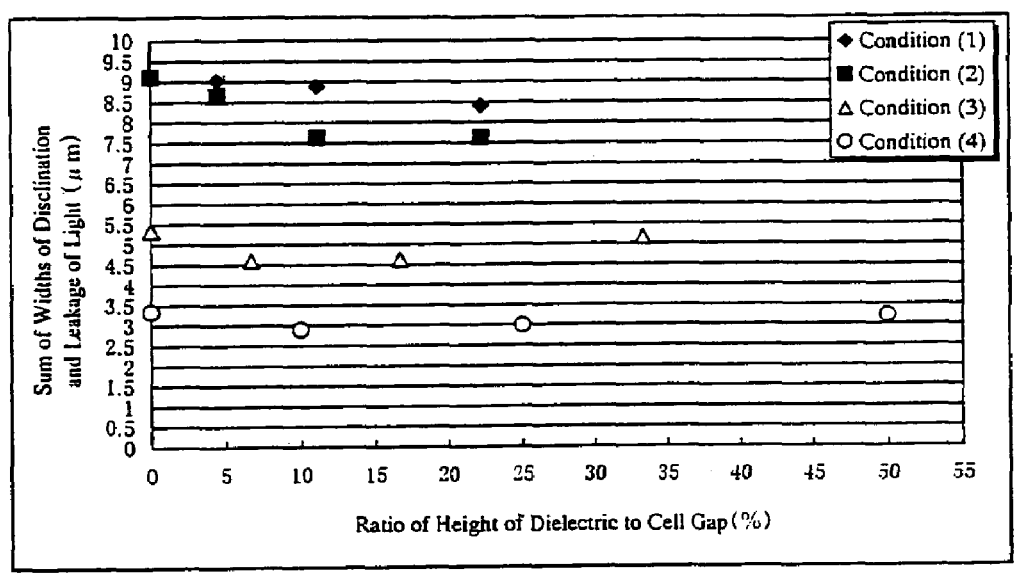
FIG. 4 is a diagram illustrating a relationship between the height of the dielectric and the sum of widths of the leakage of light and the disclination.
Figure 5A:
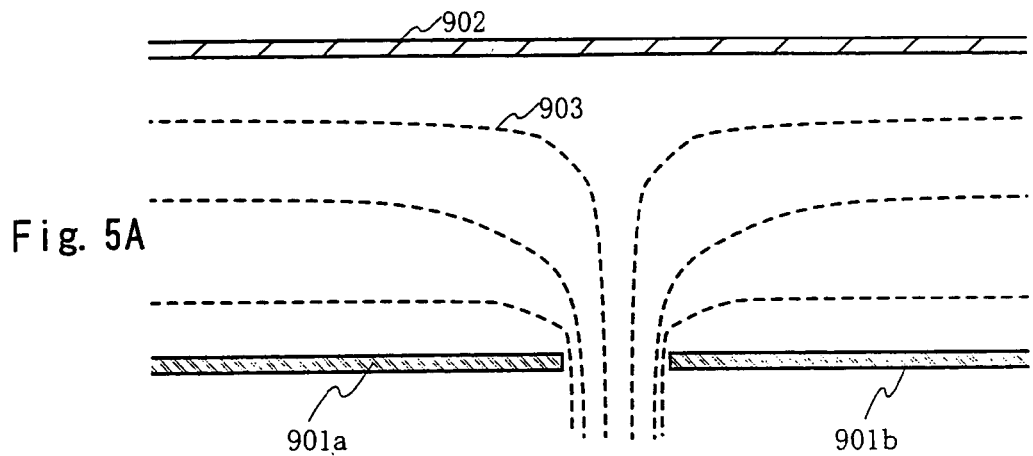
FIGS. 5A to 5C are sectional views schematically illustrating the principle of this invention.
Figure 5B:
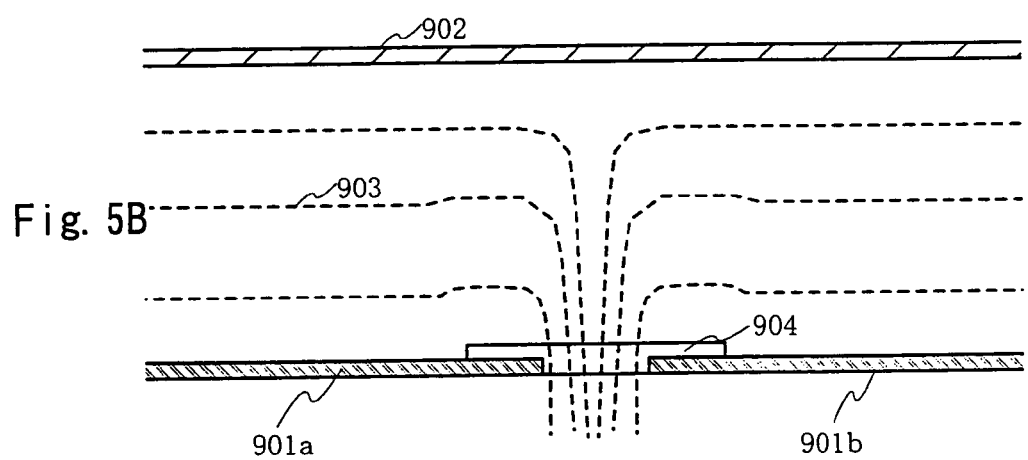
Figure 5C:
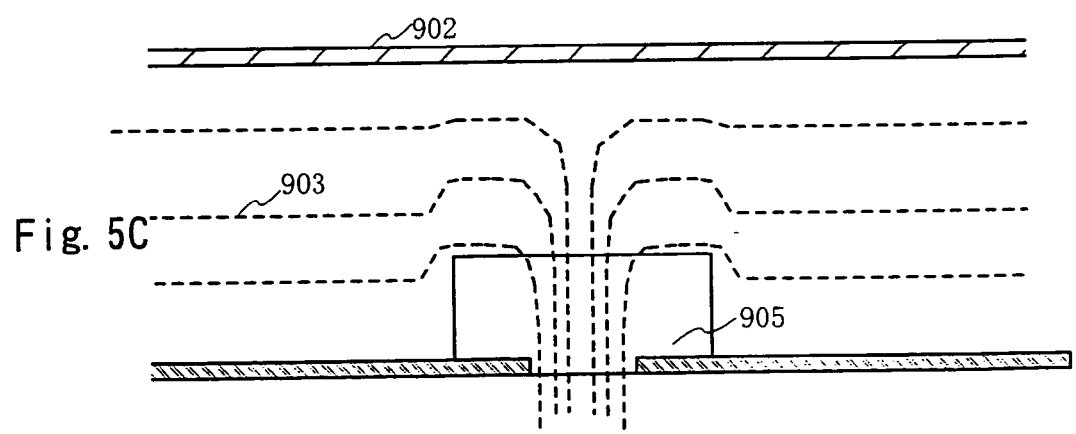

Referring to Embodiment 1 and the graph of FIG. 4 and by selecting the height of the dielectric to be 0.5 μm, the relative dielectric constant of the dielectric to be 30 and the cell gap to be 4.5 μm, it is estimated that the sum of widths by which the leakage of light and the disclination are decreased is 1.5 μm as compared with when there is no dielectric 615.

The thus fabricated liquid crystal display panel can be used as a display unit for a variety of electronic devices.

Embodiment 3

The liquid crystal display device formed by implementing an embodiment either above-mentioned Embodiments 1 or 2 can be applied to various electro-optical equipments. Thus the present invention can be applied to all of the electronic equipments having these electro-optical devices as the display portion.

The following can be given as Embodiments of the electronic equipment: video cameras; digital cameras; projectors; head mounted displays (goggle type display); car navigation systems; car stereo; personal computers, portable information terminals (such as mobile computers, portable telephones and electronic notebook). An example of these is shown in FIGS. 15A to 15F, 16A to 16D, and 17A to 17C.

Figure 15A:
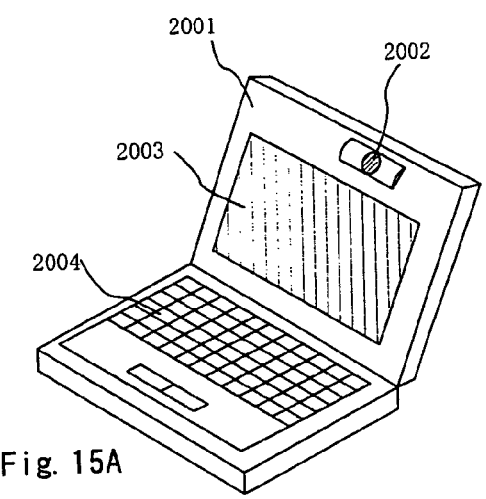
FIGS. 15A to 15F are perspective views (embodiment 3) illustrating examples of electronic devices.

FIG. 15A shows a personal computer, and it includes a main body 20(01, an image input section 2002, a display portion 2003, and a keyboard 2004. The present invention is applicable to the display portion 2003.

Figure 15B:
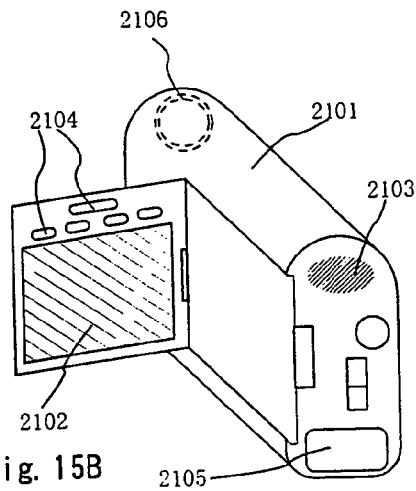

FIG. 15B shows a video camera, and it includes a main body 2101, a display portion 2102, a voice input section 2103, operation switches 2104, a battery 2105, and an image receiving section 2106. The present invention is applicable to the display portion 2102.

Figure 15C:
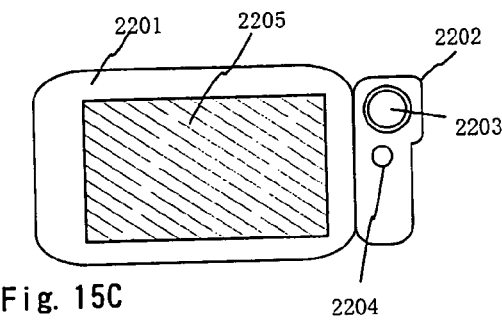

FIG. 15C shows a mobile computer, and it includes a main body 2201, a camera section 2202, an image receiving section 2203, operation switches 2204, and a display portion 2205. The present invention is applicable to the display portion 2205.

Figure 15D:
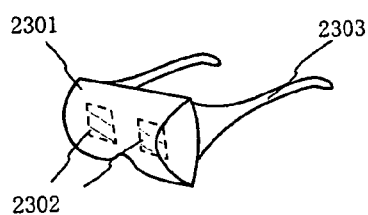

FIG. 15D shows a goggle type display, and it includes a main body 2301; a display portion 2302; and an arm section 2303. The present invention is applicable to the display portion 2302.

Figure 15E:
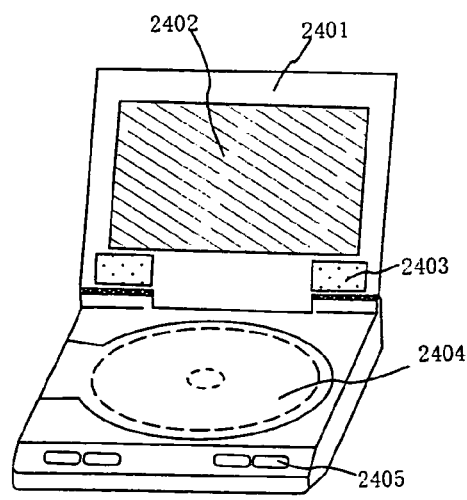

FIG. 15E shows a player using a recording medium which records a program (hereinafter referred to as a recording medium), and it includes a main body 2401; a display portion 2402; a speaker section 2403; a recording medium 2404; and operation switches 2405. This player uses DVD (Digital Versatile Disc), CD, etc. for the recording medium, and can be used for music appreciation, film appreciation, games and Internet. The present invention is applicable to the display portion 2402.

Figure 15F:
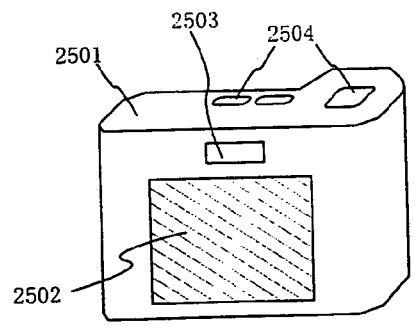

FIG. 15F shows a digital camera, and it includes a main body 2501; a display portion 2502; a view finder 2503; operation switches 2504; and an image receiving section (not shown in the figure). The present invention can be applied to the display portion 2502.

Figure 16A:
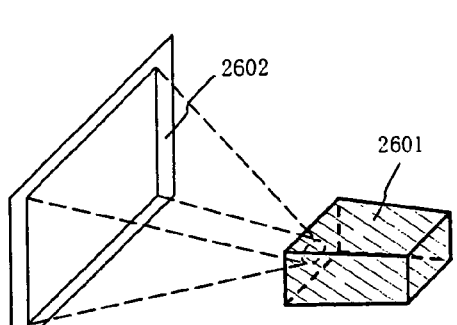
FIGS. 16A to 16D are views (embodiment 3) illustrating an example of an electronic device.

FIG. 16A is a front-type projector, and it includes a projection device 2601 and a screen 2602. The present invention is applicable to a liquid crystal display device 2808 which comprises one of the projection device 2601.

Figure 16B:
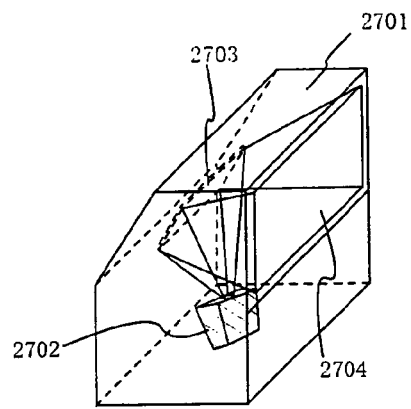

FIG. 16B is a rear-type projector, and it includes a main body 2701, a projection device 2702, a mirror 2703, and a screen 2704. The present invention is applicable to a liquid crystal display device 2808 which comprises one of the projection device 2702.

Figure 16C:
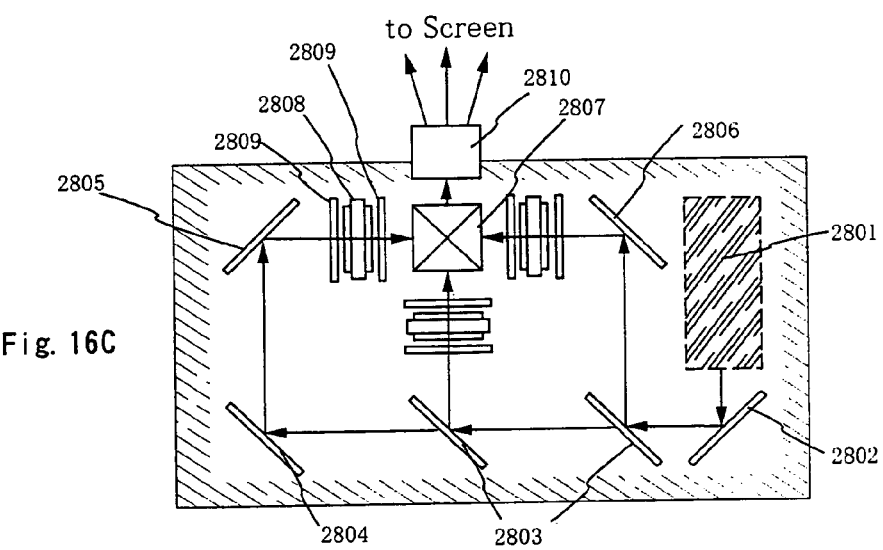

FIG. 16C is a diagram showing an example of the structure of the projection devices 2601, 2702 in FIGS. 16A and 16B. The projection device 2601 or 2702 comprises a light source optical system 2801, mirrors 2802, 2804 to 2806, dichroic mirrors 2803, a prism 2807, liquid crystal display devices 2808, phase difference plates 2809, and a projection optical system 2810. The projection optical system 2810 is composed of an optical system including a projection lens. This Embodiment shows an example of three-plate type but not particularly limited thereto. For instance, the invention may be applied also to a single plate type optical system. Further, in the light path indicated by an arrow in FIG. 16C, an optical system such as an optical lens, a film having a polarization function, a film for adjusting a phase difference, and an IR film may be suitably provided by a person who carries out the invention.

Figure 16D:
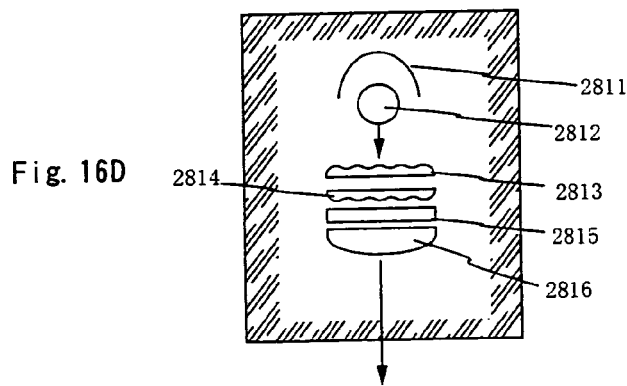

FIG. 16D is a diagram showing an example of the structure of the light source optical system 2801 in FIG. 16C. In this embodiment, the light source optical system 2801 comprises a reflector 2811, a light source 2812, lens arrays 2813, 2814, a polarization conversion element 2815, and a condenser lens 2816. The light source optical system shown in FIG. 16D is merely an example, and is not particularly limited to the illustrated structure. For example, a person who carries out the invention is allowed to suitably add to the light source optical system an optical system such as an optical lens, a film having a polarization function, a film for adjusting a phase difference, and an IR film.

Note that a transmission electro-optical device is used as the projector shown in FIGS. 16A to 16D, a reflection type electro-optical device is not illustrated.

Figure 17A:
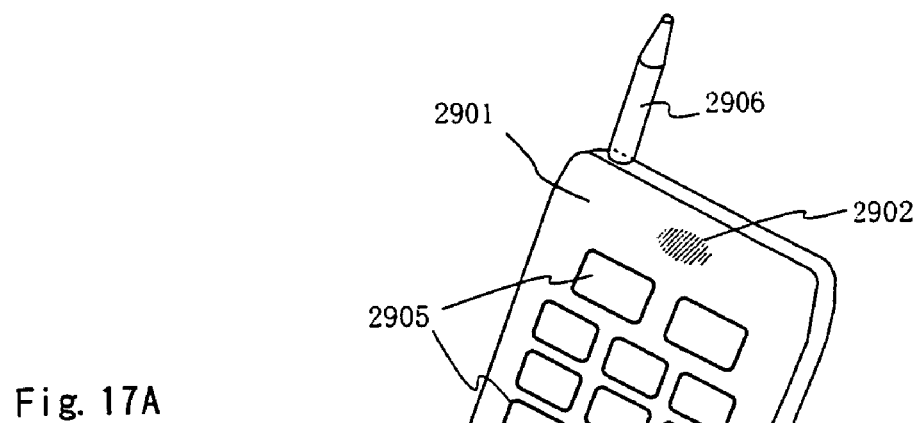
FIGS. 17A to 17C are views (embodiment 3) illustrating examples of electronic devices.

FIG. 17A is a portable telephone, and it includes a main body 2901, an audio output section 2902, an audio input section 2903, a display portion 2904, operation switches 2905, and an antenna 2906. The present invention can be applied to the display portion 2904.

Figure 17B:
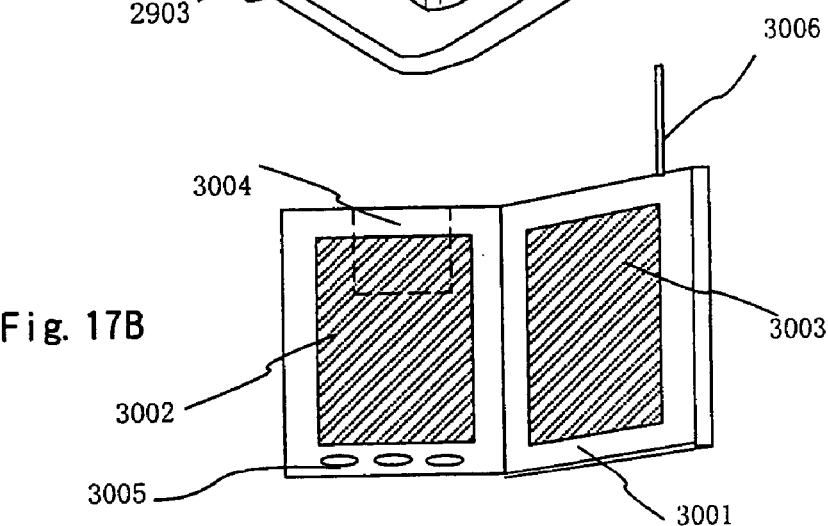

FIG. 17B is a portable book (electronic book), and it includes a main body 3001, display portions 3002 and 3003, a recording medium 3004, operation switches 3005, and an antenna 3006. The present invention can be applied to the display portions 3002 and 3003.

Figure 17C:
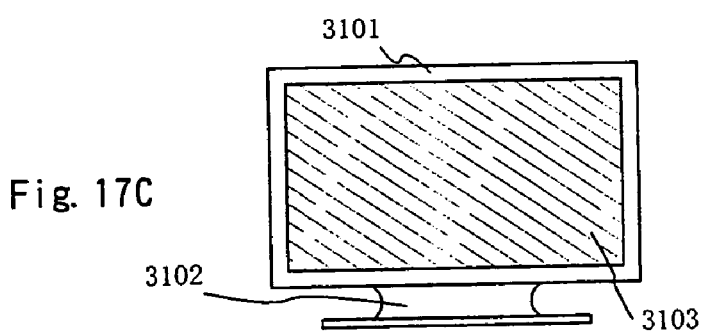
Figure 18:
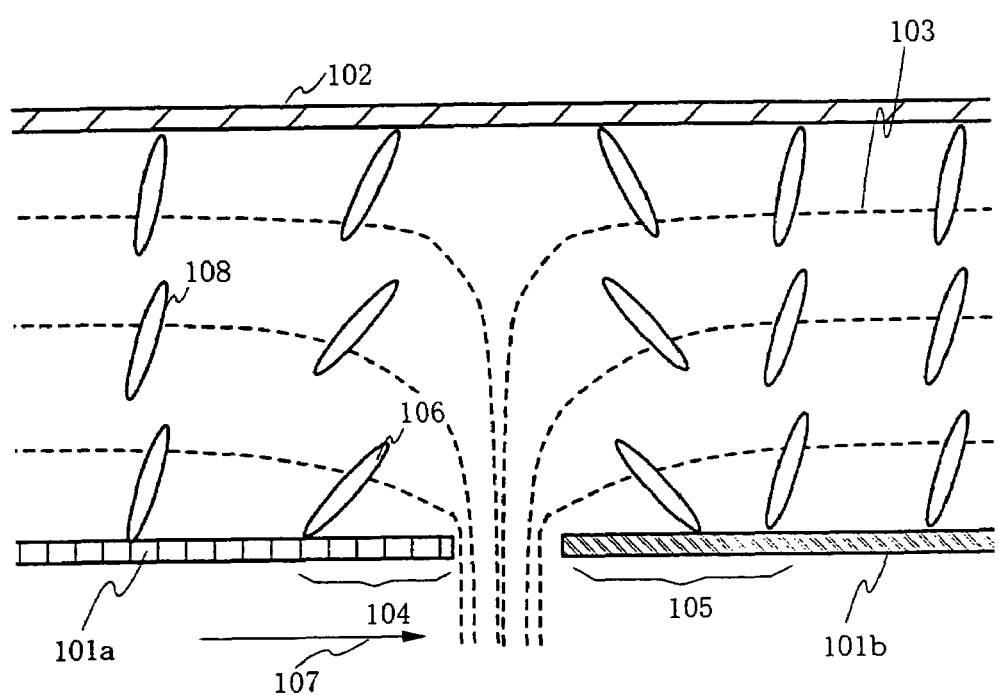
FIG. 18 is a sectional view illustrating the disclination and the leakage of light.
Figure 19:
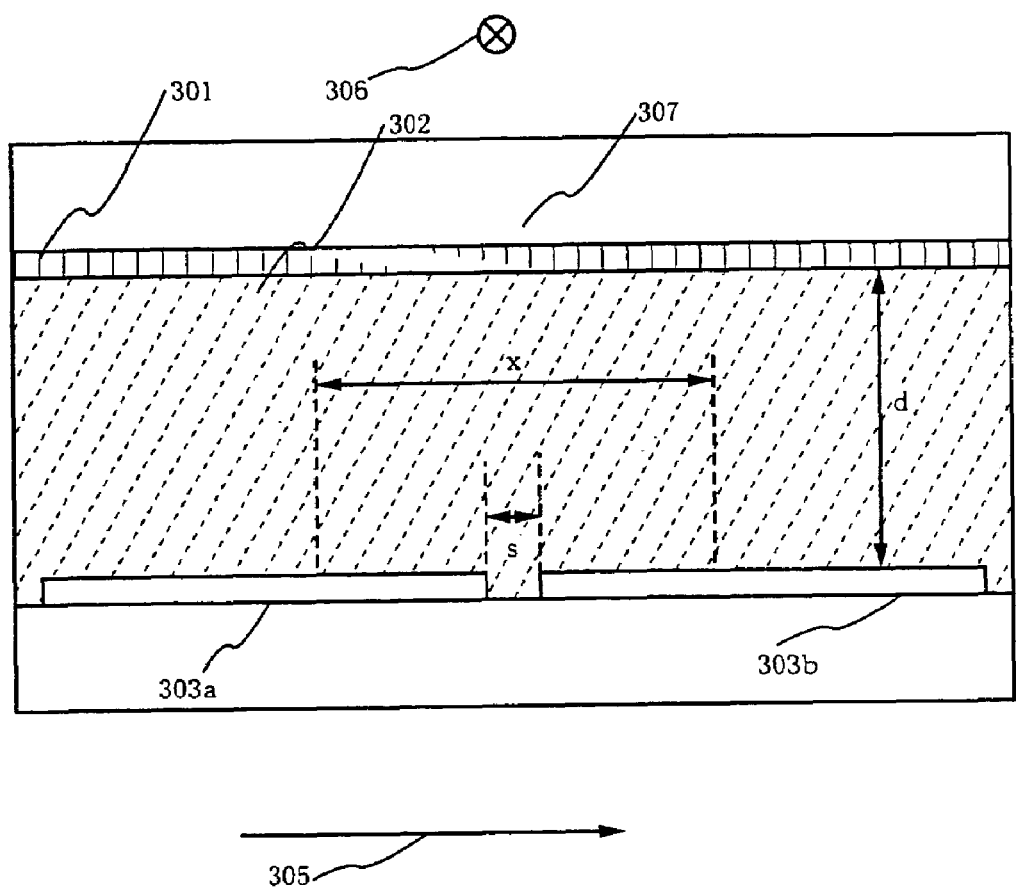
FIG. 19 is a sectional view illustrating a model of simulation.
Figure 20:
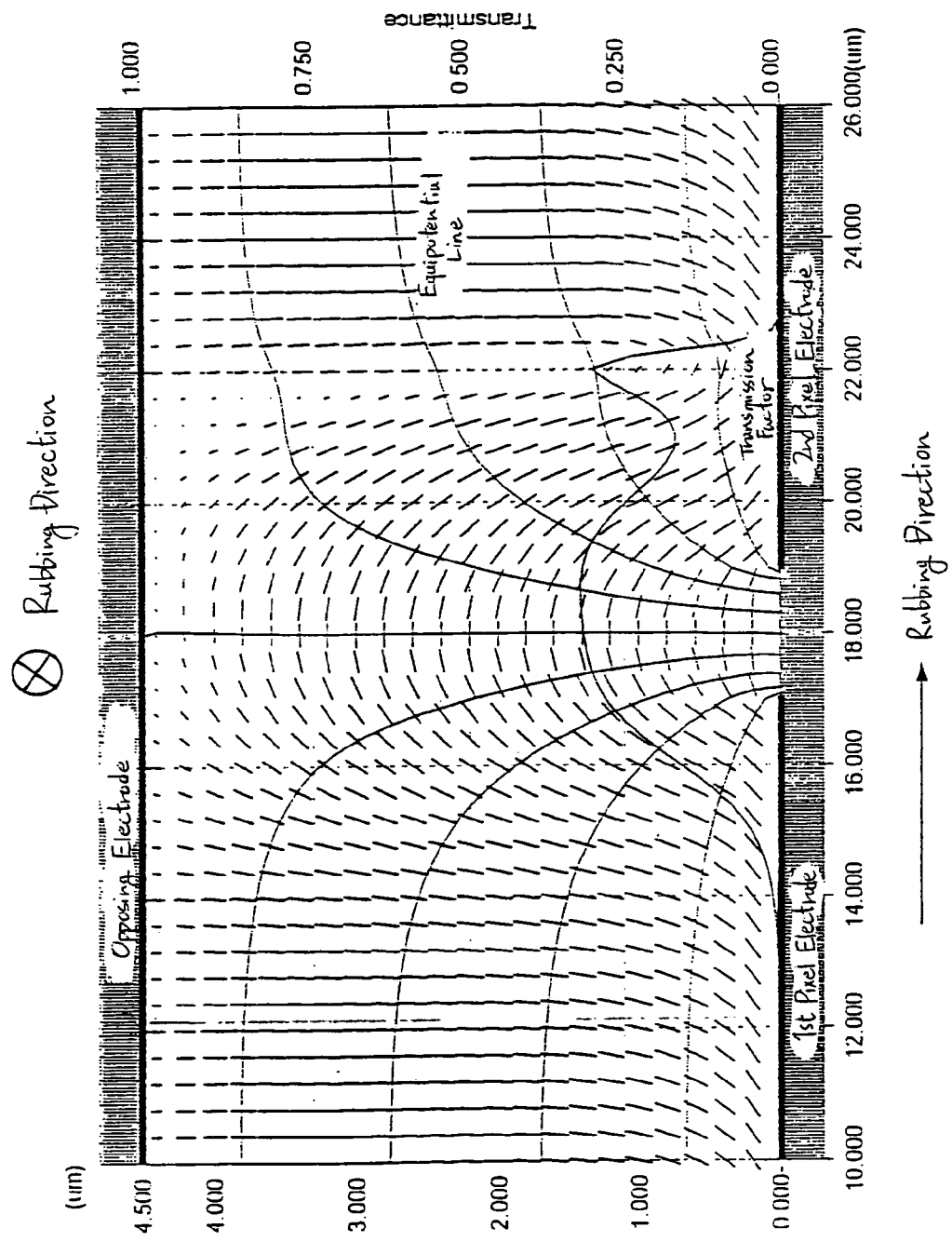
FIG. 20 is a sectional view illustrating the results of simulation of liquid crystal orientation at the ends of the pixel electrodes.
Figure 21A:
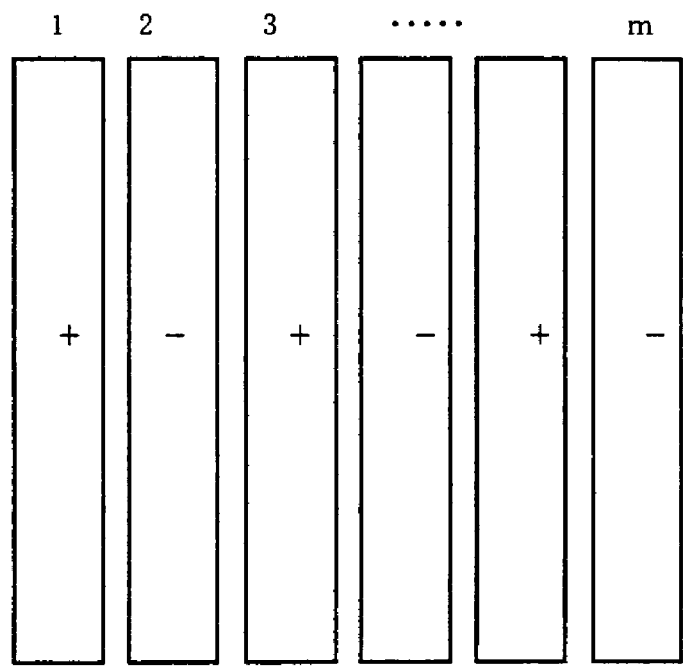
FIGS. 21A and 21B are top views illustrating the reverse-drive of the source lines.
Figure 21B:
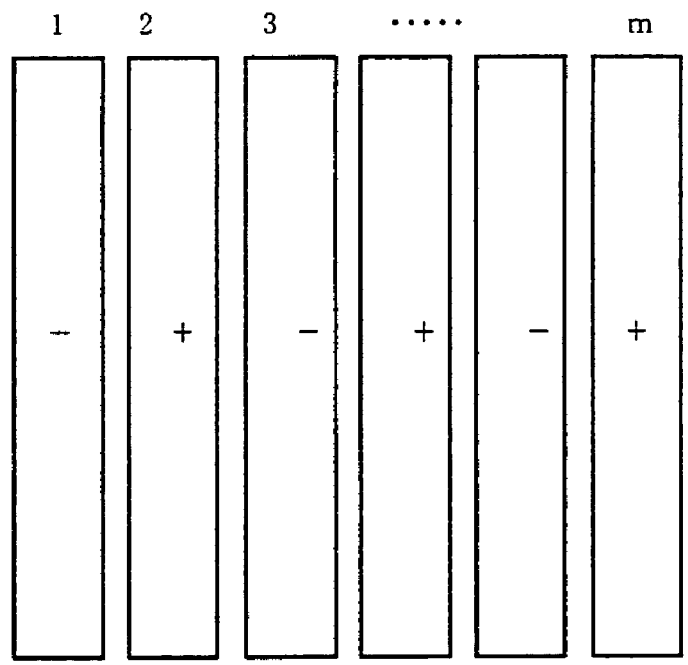

FIG. 17C is a display, and it includes a main body 3101, a support stand 3102, and a display portion 3103. The present invention can be applied to the display portion 3103. The display of the present invention is advantageous for a large size screen in particular, and is advantageous for a display equal to or greater than 10 inches (especially equal to or greater than 30 inches) in diagonal.

The applicable range of the present invention is thus extremely wide, and it is possible to apply the present invention to electronic equipment in all fields. Further, the electronic equipment of Embodiment 3 can be realized by using a constitution of any combination of Embodiments 1 and 2.

As described above, this invention provides a liquid crystal display device which decreases the defective orientation of liquid crystals such as disclination and leakage of light of when the black level is displayed, and which can be favorably watched maintaining a high contrast.

The leakage of light and the disclination occur in the liquid crystal display device at the ends of the pixel electrodes due to that the equipotential plane bends toward the pixel electrodes, establishing an electric field in a direction inclined relative to the surfaces of the pixel electrodes and causing the liquid crystals to be oriented along the electric field in the inclined direction. Therefore, a dielectric of a high dielectric constant is provided at the ends of the pixel electrodes to set the equipotential plane to be in parallel with the surfaces of the pixel electrodes, thereby to prevent the disclination and the leakage of light of liquid crystals.

What is claimed is:

1. A liquid crystal display device comprising:
   a pixel electrode having at least a first region and a second region formed over a substrate;
   a dielectric formed on the first region of the pixel electrode;
   an orientation film formed on the second region of the pixel electrode and the dielectric; and
   liquid crystals having a positive dielectric anisotropy and formed over the orientation film,
   wherein a relative dielectric constant of the dielectric is larger than that of the liquid crystals in the direction of long axis.

2. A liquid crystal display device according to claim 1, further comprising an opposing electrode on an opposing substrate, wherein a cell gap between the pixel electrode and the opposing electrode is not larger than 4.5 µm, and the height of the dielectric is not larger than 25% of the cell gap.

3. A liquid crystal display device according to claim 1, further comprising an opposing electrode provided facing the pixel electrodes, and an oriented film formed on opposing electrode, wherein a gap is maintained between the dielectric and the oriented film formed on the opposing electrode.

4. A liquid crystal display device according to claim 1, wherein the dielectric is an oxide containing titanium or tantalum.

5. A liquid crystal display device according to claim 1, wherein said liquid crystal display device is incorporated into an electronic equipment selected from the group consisting of a video camera, a digital camera, a projector, a head mounted display, a car navigation system, a car stereo, a personal computer, and a portable information terminal.

6. A liquid crystal display device according to claim 1, wherein the dielectric has a trapezoidal shape in a cross section.

7. A liquid crystal display device according to claim 1, wherein the dielectric has an arcuate shape in a cross section.

8. A liquid crystal display device comprising:
   a pixel electrode having at least a first region and a second region formed over a substrate;
   an orientation film formed on the first region and the second region of the pixel electrode;
   a dielectric formed on the orientation film over the first region of the pixel electrode; and
   liquid crystals having a positive dielectric anisotropy and formed over the orientation film and the dielectric,
   wherein a relative dielectric constant of the dielectric is larger than that of the liquid crystals in the direction of long axis.

9. A liquid crystal display device according to claim 8, further comprising an opposing electrode on an opposing substrate, wherein a cell gap between the pixel electrode and the opposing electrode is not larger than 4.5 µm, and the height of the dielectric is not larger than 25% of the cell gap.

10. A liquid crystal display device according to claim 8, further comprising an opposing electrode provided facing the pixel electrodes, and an oriented film formed on opposing electrode, wherein a gap is maintained between the dielectric and the oriented film formed on the opposing electrode.

11. A liquid crystal display device according to claim 8, wherein the dielectric is an oxide containing titanium or tantalum.

12. A liquid crystal display device according to claim 8, wherein said liquid crystal display device is incorporated into an electronic equipment selected from the group consisting of a video camera, a digital camera, a projector, a head mounted display, a car navigation system, a car stereo, a personal computer, and a portable information terminal.

13. A liquid crystal display device according to claim 8, wherein the dielectric has a trapezoidal shape in a cross section.

14. A liquid crystal display device according to claim 8, wherein the dielectric has an arcuate shape in a cross section.

15. A liquid crystal display device according to claim 8, wherein the dielectric has an arcuate shape in a cross section.

16. A liquid crystal display device comprising:
   a first pixel electrode having at least a first region and a second region formed over a substrate;
   a second pixel electrode having at least a third region and a fourth region formed over the substrate;
   a dielectric formed on the first region of the first pixel electrode and the third region of the second pixel electrode;

an orientation film formed on the dielectric, the second region of the first pixel electrode, and the fourth region of the second pixel electrode; and liquid crystals having a positive dielectric anisotropy and formed over the orientation film and the dielectric, wherein a relative dielectric constant of the dielectric is larger than that of the liquid crystals in the direction of long axis.

17. A liquid crystal display device according to claim 16, further comprising an opposing electrode on an opposing substrate, wherein a cell gap between the pixel electrode and the opposing electrode is not larger than 4.5 μm, and the height of the dielectric is not larger than 25% of the cell gap.

18. A liquid crystal display device according to claim 16, further comprising an opposing electrode provided facing the pixel electrodes, and an oriented film formed on opposing electrode, wherein a gap is maintained between the dielectric and the oriented film formed on the opposing electrode.

19. A liquid crystal display device according to clalm 16, wherein the dielectric is an oxide containing titanium or tantalum.

20. A liquid crystal display device according to clalm 16, wherein said liquid crystal display device is incorporated into an electronic equipment selected from the group consisting of a video camera, a digital camera, a projector, a head mounted display, a car navigation system, a car stereo, a personal computer, and a portable information terminal.

21. A liquid crystal display device according to claim 16, wherein the dielectric has a trapezoidal shape in a cross section.

22. A liquid crystal display device comprising:
a first pixel electrode having at least a first region and a second region formed over a substrate;
a second pixel electrode having at least a third region and a fourth region formed over the substrate;
an orientation film formed on the first region and the second region of the first pixel electrode and the third region and the fourth region of the second pixel electrode;
a dielectric formed on the orientation film over the first region of the first pixel electrode and over the third region of the second pixel electrode; and liquid crystals having a positive dielectric anisotropy and formed over the orientation film and the dielectric, wherein a relative dielectric constant of the dielectric is larger than that of the liquid crystals in the direction of long axis.

23. A liquid crystal display device according to claim 22, further comprising an opposing electrode on an opposing substrate, wherein a cell gap between the pixel electrode and the opposing electrode is not larger than 4.5 μm, and the height of the dielectric is not larger than 25% of the cell gap.

24. A liquid crystal display device according to claim 22, further comprising an opposing electrode provided facing the pixel electrodes, and an oriented film formed on opposing electrode, wherein a gap is maintained between the dielectric and the oriented film formed on the opposing electrode.

25. A liquid crystal display device according to claim 22, wherein the dielectric is an oxide containing titanium or tantalum.

26. A liquid crystal display device according to claim 22, wherein said liquid crystal display device is incorporated into an electronic equipment selected from the group consisting of a video camera, a digital camera, a projector, a head mounted display, a car navigation system, a car stereo, a personal computer, and a portable information terminal.

27. A liquid crystal display device according to claim 22, wherein the dielectric has a trapezoidal shape in a cross section.

28. A liquid crystal display device according to claim 22, wherein the dielectric has an arcuate shape in a cross section.

* * * * *